US010115017B2

(12) United States Patent
Jeong et al.

(10) Patent No.: US 10,115,017 B2
(45) Date of Patent: Oct. 30, 2018

(54) ELECTRONIC DEVICE AND IMAGE DISPLAY METHOD THEREOF

(71) Applicant: Samsung Electronics Co., Ltd., Gyeonggi-do (KR)

(72) Inventors: Seunghwan Jeong, Gyeonggi-do (KR); Daehee Kim, Gyeonggi-do (KR); Chang-Sun Lee, Gyeonggi-do (KR); Seungbum Lee, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 15/052,423

(22) Filed: Feb. 24, 2016

(65) Prior Publication Data
US 2016/0253564 A1 Sep. 1, 2016

(30) Foreign Application Priority Data
Feb. 27, 2015 (KR) .................. 10-2015-0028656

(51) Int. Cl.
G06K 9/54 (2006.01)
G06K 9/00 (2006.01)
G06F 17/30 (2006.01)

(52) U.S. Cl.
CPC ... *G06K 9/00684* (2013.01); *G06F 17/30247* (2013.01); *G06F 17/30265* (2013.01); *G06F 17/30268* (2013.01)

(58) Field of Classification Search
CPC ......... G06F 17/30265; G06F 17/30247; G06F 17/30268; G06F 17/30056; G06K 9/6267; G06K 9/00684; G06K 9/6218; G06K 9/00483; G06Q 50/01; G06Q 50/163

USPC ....................... 382/224, 225, 305
See application file for complete search history.

(56) References Cited

U.S. PATENT DOCUMENTS

| 6,538,698 | B1 * | 3/2003 | Anderson | H04N 5/772 |
| | | | | 348/231.2 |
| 8,150,098 | B2 | 4/2012 | Gallagher et al. | |
| 8,649,602 | B2 * | 2/2014 | Tang | G06F 17/30247 |
| | | | | 382/181 |
| 8,737,739 | B2 | 5/2014 | Tang et al. | |
| 9,349,077 | B2 * | 5/2016 | Capuozzo | G06F 17/30265 |
| 9,396,356 | B2 * | 7/2016 | Pereira | G06F 21/6272 |
| 9,407,860 | B2 * | 8/2016 | Barnes, Jr. | H04N 5/77 |
| 9,471,600 | B2 * | 10/2016 | Soderberg | G06F 17/30265 |
| 9,626,382 | B2 * | 4/2017 | De Armas | G06F 17/30274 |

(Continued)

FOREIGN PATENT DOCUMENTS

EP 2 402 867 1/2012
WO WO 2010/102515 9/2010

OTHER PUBLICATIONS

Marjo Markkula et al., "End-User Searching Challenges Indexing Practices in the Digital Newspaper Photo Archive", published in Information Retrieval, Jan. 1, 2000, 37 pages.

(Continued)

*Primary Examiner* — Daniel Mariam
(74) *Attorney, Agent, or Firm* — The Farrell Law Firm, P.C.

(57) ABSTRACT

An apparatus and method are provided for displaying an image. A method includes acquiring at least one image and at least one tag corresponding to the image; classifying the image into at least one group, based on the tag; and displaying the image corresponding to the group.

20 Claims, 16 Drawing Sheets

(56) References Cited

U.S. PATENT DOCUMENTS

| | | | |
|---|---|---|---|
| 2006/0059427 A1* | 3/2006 | Reid | G06F 17/30265 |
| | | | 715/731 |
| 2011/0137989 A1 | 6/2011 | Kiciman et al. | |
| 2012/0141023 A1 | 6/2012 | Wang et al. | |
| 2012/0311509 A1* | 12/2012 | Maggiotto | G06F 3/04817 |
| | | | 715/863 |
| 2013/0195375 A1 | 8/2013 | Anbalagan et al. | |
| 2013/0339437 A1 | 12/2013 | De Armas | |
| 2014/0079322 A1 | 4/2014 | Yamaji et al. | |
| 2014/0189539 A1* | 7/2014 | St. Clair | G06F 3/048 |
| | | | 715/753 |
| 2015/0026272 A1* | 1/2015 | Nagata | H04L 51/046 |
| | | | 709/206 |
| 2015/0156247 A1* | 6/2015 | Hensel | H04L 67/06 |
| | | | 709/219 |
| 2016/0019298 A1* | 1/2016 | Brodie | G06F 17/30867 |
| | | | 707/734 |

OTHER PUBLICATIONS

International Search Report dated Jun. 9, 2016 issued in counterpart application No. PCT/KR2016/001792, 10 pages.
European Search Report dated Jul. 5, 2016 issued in counterpart application No. 16157357.1-1951, 8 pages.
European Search Report dated Jun. 29, 2017 issued in counterpart application No. 16157357.1-1871, 5 pages.
European Summons to Attend Oral Proceedings dated May 7, 2018 issued in counterpart application No. 16157357.1-1217, 8 pages.

* cited by examiner

ELECTRONIC DEVICE AND IMAGE DISPLAY METHOD THEREOF

PRIORITY

This application claims priority under 35 U.S.C. § 119(a) to Korean Application Serial No. 10-2015-0028656, which was filed in the Korean Intellectual Property Office on Feb. 27, 2015, the entire content of which is incorporated herein by reference.

BACKGROUND

1. Field of the Disclosure

The present disclosure relates generally to an electronic device and an operation method thereof, and more particularly, to an electronic device and an image display method thereof.

2. Description of the Related Art

While an electronic device, e.g., a mobile device or a user device, may arrange and display data stored in the electronic device or an external device (e.g., a server, another electronic device, etc.), it is often difficult for a user of the electronic device to determine information on the data or identify a correlation between pieces of data. For example, the user cannot easily identify desired information without additional information (e.g., a classification reference or the like) on the data stored in the electronic device, and therefore, may have difficulty in efficiently using services provided by the electronic device.

SUMMARY

The present disclosure is made to address at least the problems and/or disadvantages described above and to provide at least the advantages described below.

Accordingly, an aspect of the present disclosure is to provide an image display apparatus and method for improved use efficiency of an electronic device (e.g., a portable terminal).

Another aspect of the present disclosure is to provide an image display apparatus and method for effectively displaying a plurality of images in an electronic device.

Another aspect of the present disclosure is to provide an electronic device and a method for grouping images and displaying the images according to each group.

Another aspect of the present disclosure is to provide an electronic device and a method for effectively displaying images and providing information on the images.

Another aspect of the present disclosure is to provide an electronic device and a method for correlating images, in order to utilize information and functions that a user desires and improve availability of the electronic device.

In accordance with an aspect of the present disclosure, a method of displaying an image by an electronic device is provided. The method includes acquiring at least one image and at least one tag corresponding to the image; classifying the image into at least one group, based on the tag; and displaying the image corresponding to the group.

In accordance with another aspect of the present disclosure, an electronic device is provided. The electronic device includes a controller configured to acquire at least one image and at least one tag corresponding to the image; an image manager configured to classify the image into at least one group based on the tag; and a display unit configured to display the image corresponding to the group.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
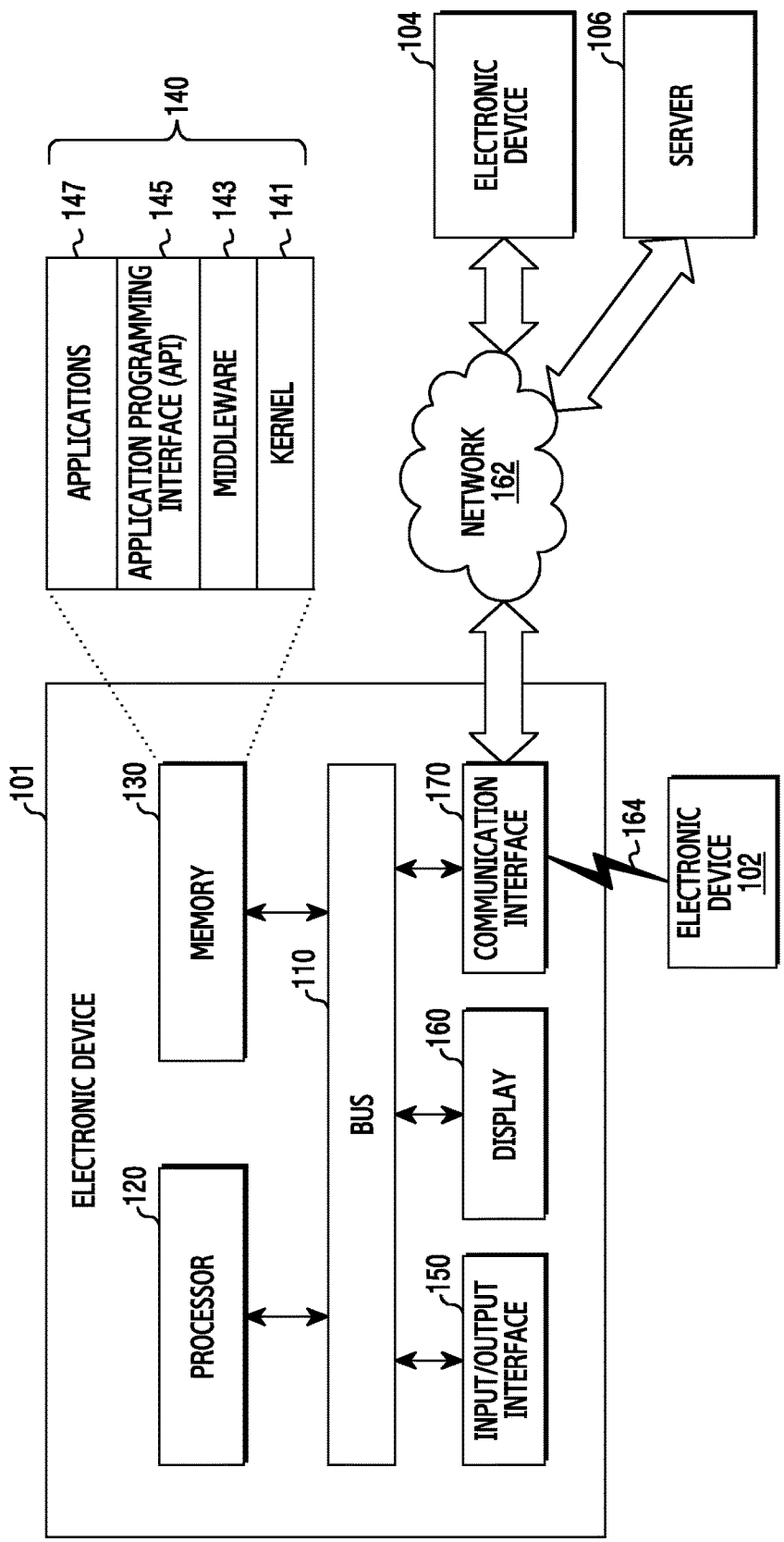
FIG. 1 illustrates a network environment system according to an embodiment of the present disclosure.

Various embodiments of the present disclosure will be described herein below with reference to the accompanying drawings. However, the present disclosure is not limited to the specific embodiments and should be construed as including modification, equivalent and/or alternative of embodiments of the present disclosure.

In the drawings, similar reference numerals may be used to identify similar elements.

The terms used to describe the various embodiments of the present disclosure are for the purpose of describing particular embodiments and are not intended to limit the present disclosure. As used herein, singular forms are intended to include the plural forms as well, unless the context clearly indicates otherwise.

Further, all of the terms used herein, including technical or scientific terms, have the same meanings as those generally understood by a person having ordinary skill in the art, unless they are defined otherwise. The terms defined in a generally used dictionary should be defined as having the same or similar meanings as the contextual meanings of the relevant technology and should not be interpreted as having ideal or exaggerated meanings, unless clearly defined as such. According to context, even the terms that are defined herein should not be interpreted as excluding other embodiments of the present disclosure.

Herein, the terms "have," "may have," "include," and "may include" indicate the presence of corresponding features (e.g., elements such as numerical values, functions, operations, or parts), and do not preclude the presence of additional features.

The terms "A or B," "at least one of A or/and B," or "one or more of A or/and B" include all possible combinations of items enumerated with them. For example, "A or B," "at least one of A and B," or "at least one of A or B" may include (1) at least one A, (2) at least one B, or (3) both at least one A and at least one B.

Terms such as "first" and "second" may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope of right of various embodiments of the present disclosure, and similarly, a second element may be referred to as a first element.

When an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. However, when the first element is "directly coupled with/to" or "directly connected to" the second element, there is no intervening element between the first element and the second element.

The expression "configured to (or set to)" may be used interchangeably with "suitable for," "having the capacity to," "designed to," "adapted to," "made to," or "capable of" according to context. Further, the term "configured to" does not necessarily mean "specifically designed to" in a hardware level. Instead, the expression "apparatus configured to . . . " may mean that the apparatus is "capable of . . . " along with other devices or parts in a certain context. For example, "a processor configured to perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

An electronic device according to an embodiment of the present disclosure may be a smartphone, a tablet personal computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a mobile medical machine, a camera, or a wearable device (e.g., smart glasses, a head-mounted-device (HMD), electronic clothing, an electronic bracelet, an electronic necklace, an electronic accessory, electronic tattoos, a smart mirror, or a smart watch).

The electronic device may also be a smart home appliance, such as a television (TV), a Digital Video Disk (DVD) player, a stereo, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Goggle TV®), a game console (e.g., Xbox® or PlayStation®), an electronic dictionary, an electronic key, a camcorder, or an electronic album.

The electronic device may also be a medical machine (e.g., a glucose monitor, a heart rate monitor, a blood pressure measuring device, a thermometer, Magnetic Resonance Angiography (MRA), Magnetic Resonance Imaging (MRI), Computerized Tomography (CT), a tomograph, an ultrasound machine, etc.), a navigation device, a Global Positioning System (GPS) receiver, an Event Data Recorder (EDR), a Flight Data Recorder (FDR), an automotive infotainment device, electronic equipment for a ship (e.g., a navigation equipment for a ship, a gyro compass, etc.), avionics, a security device, a head unit for vehicles, an industrial or home robot, an automatic teller machine (ATM), point of sales (POS) device of a store, or Internet of Things (IoT) device (e.g., a lamp, various sensors, an electric or gas meter, a sprinkler, a fire alarm, a thermostat, a streetlamp, a toaster, an exercising machine, a hot water tank, a heater, a boiler, etc.).

The electronic device may also be a part of furniture or a building/a structure, an electronic board, an electronic signature receiving device, a projector, or a measurement device (e.g., devices for measuring water, power, gas, radio waves, etc.).

In addition, the electronic device may be a flexible electronic device.

The electronic device may also be a combination of two or more of the above-described devices.

In addition, the electronic device is not limited to the above-described devices, and may include a new electronic device according to the development of new technologies.

Herein, the term "user" may refer to a person who uses the electronic device or a device that uses the electronic device (e.g., an artificial intelligence electronic device).

FIG. 1 illustrates a network environment including an electronic device according to an embodiment of the present disclosure.

Referring to FIG. 1, the electronic device 101 includes a bus 110, a processor 120, a memory 130, an input and output interface 150, a display 160, and a communication interface 170. Alternatively, the electronic device 101 may omit at least one of the elements or may include additional elements.

The bus 110 may include a circuit, which connects the elements 110-170 with one another and transmits communication (e.g., a control message and/or data) between the elements.

The processor 120 may include one or more of a CPU, an application processor (AP), or a communication processor (CP). The processor 120 may execute calculation or data processing related to control and/or communication of at least one other element of the electronic device 101.

The memory 130 may include a volatile and/or non-volatile memory. For example, the memory 130 may store instructions or data that is related to at least one other element of the electronic device 101.

The memory 130 stores software and/or a program 140. The program 140 includes a kernel 141, middleware 143, an Application Programming Interface (API) 145, and application programs (or applications) 147. At least some of the kernel 141, the middleware 143, or the API 145 may be referred to as an operating system (OS).

The kernel 141 may control or manage system resources (e.g., the bus 110, the processor 120, the memory 130, etc.) used for performing operations or functions implemented in the other programs (e.g., the middleware 143, the API 145, or the applications 147). In addition, the kernel 141 may provide an interface for the middleware 143, the API 145, or the applications 147 to access an individual element of the electronic device 101 and control or manage the system resources.

The middleware 143 may serve as an intermediary for the API 145 or the applications 147 to communicate with the kernel 141 and exchange data with the kernel 141.

In addition, the middleware 143 may process one or more operation requests received from the applications 147 according to a priority. For example, the middleware 143 may give priority to use the system resources of the electronic device 101 (e.g., the bus 110, the processor 120, the memory 130, etc.) to the applications 147. The middleware 143 may perform scheduling or load balancing with respect to the one or more operation requests by processing the one or more operation requests according to the priority given to the at least one application program.

The API 145 may allow the applications 147 to control a function provided by the kernel 141 or the middleware 143, and may include at least one interface or function (e.g., instructions) for controlling a file, controlling a window, processing an image, or controlling a text.

The input and output interface 150 may transmit instructions or data input from a user or another external device to other element(s) of the electronic device 101. In addition, the input and output interface 150 may output instructions or data received from other element(s) of the electronic device 101 to the user or another external device.

The display 160 may include a liquid crystal display (LCD), a light emitting diode (LED) display, an organic light emitting diode (OLED) display, a microelectromechanical system (MEMS) display, or an electronic paper display. The display 160 may display various contents (e.g., a text, an image, a video, an icon, a symbol, etc.) for the user. The display 160 may include a touch screen, and may receive touch, gesture, approach, and/or hovering inputs from an electronic pen or a part of a user's body.

The communication interface 170 may establish communication between the electronic device 101 and an external electronic device 102, an external electronic device 104, and/or a server 106. The communication interface 170 is connected to a network 162 via wireless communication or wire communication to communicate with the external electronic device 104 and/or the server 106.

The wireless communication may use, as a cellular communication protocol, at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), etc.

In addition, the wireless communication may include short-distance communication 164. For example, the short-distance communication 164 may include at least one of Wireless Fidelity (WiFi), Bluetooth, Near Field Communication (NFC), GPS, etc.

The wire communication may include at least one of a Universal Serial Bus (USB), a High Definition Multimedia Interface (HDMI), a Recommended Standard 232 (RS-232), or plain old telephone service (POTS).

The network 162 may include a telecommunications network, for example, at least one of a computer network (e.g., a local area network (LAN) or wide area network (WAN)), the Internet, or a telephone network.

Each of the external electronic devices 102 and 104 may be the same kind of electronic device as the electronic device 101 or a different kind of device. The server 106 may include a group of one or more servers.

All or a part of the operations executed in the electronic device 101 may also be executed in the electronic device 102 the electronic device 104, and/or the server 106, e.g., using cloud computing, distributed computing, or client-server computing technology.

When the electronic device 101 should perform a certain function or service automatically or in response to a request, the electronic device 101 may request one of the other devices to perform at least some function related to the certain function or service additionally or instead of executing the function or service by itself. Another electronic device may execute the requested function or additional function, and transmit the result to the electronic device 101. Thereafter, the electronic device 101 may process the received result as it is or additionally, and provide the requested function or service.

Figure 2:
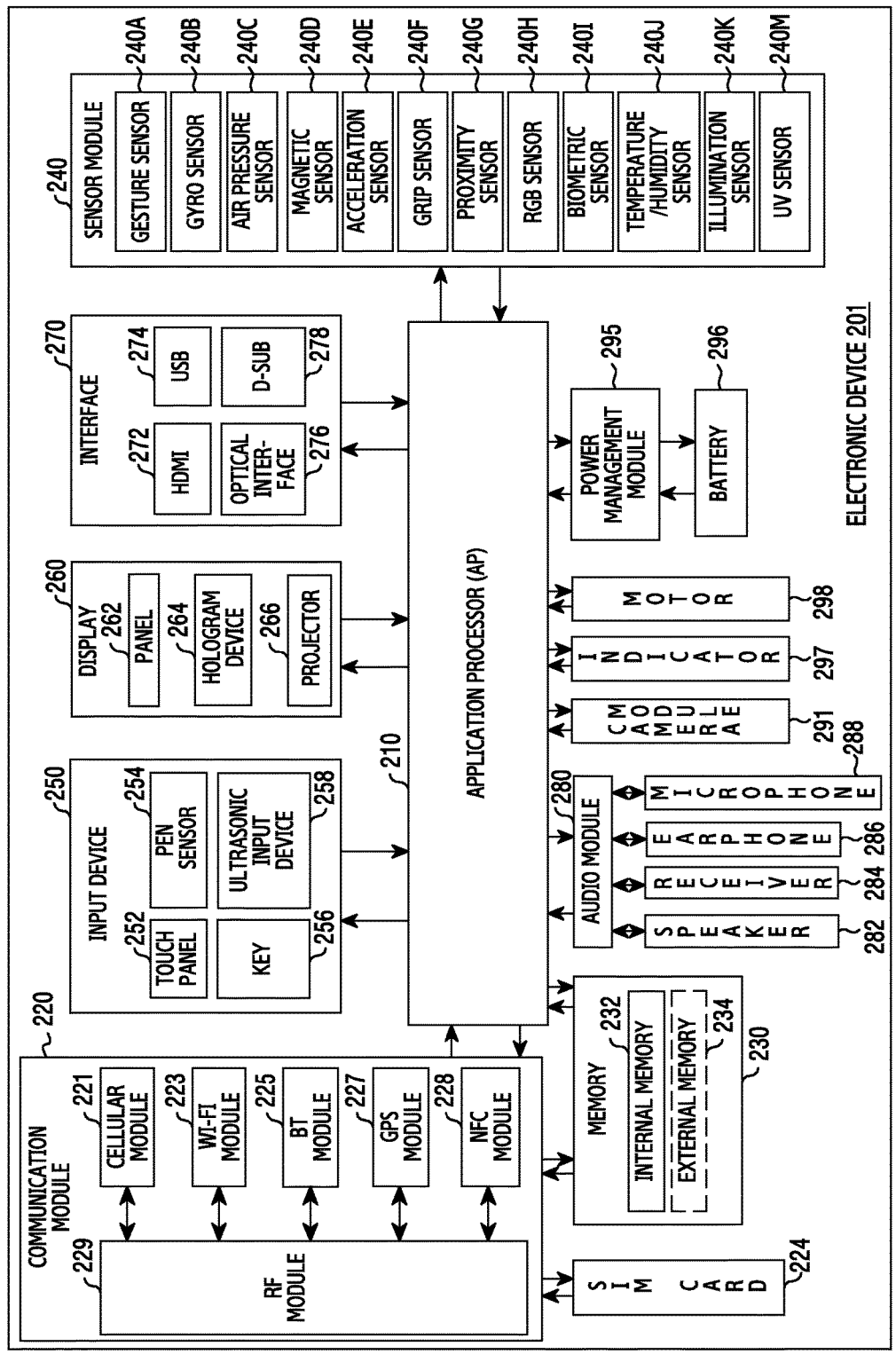
FIG. 2 illustrates an electronic device according to an embodiment of the present disclosure.

FIG. 2 illustrates an electronic device according to an embodiment of the present disclosure. For example, the electronic device 201 may be substituted for the electronic device 101 illustrated in FIG. 1.

Referring to FIG. 2, the electronic device 201 includes a processor 210 (e.g., an Application Processor (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an OS or an application program, and may process and calculate various data. For example, the processor 210 may be implemented by using a System on Chip (SoC).

The processor 210 may further include a Graphic Processing Unit (GPU) and/or an image signal processor. The processor 210 may include at least part of the other elements illustrated in FIG. 2 (e.g., a cellular module 221). The processor 210 may load instructions or data received from at least one of the other elements (e.g., a non-volatile memory) into a volatile memory and process the instructions or data, and may store various data in the non-volatile memory.

The communication module 220 includes the cellular module 221, a WiFi module 223, a BT module 225, a GPS module 227, an NFC module 228, and a Radio Frequency (RF) module 229.

The cellular module 221 may provide a voice call, a video call, a text service, or an internet service through a telecommunications network. The cellular module 221 may identify and authenticate the electronic device 201 in the telecommunications network by using the SIM 224 (e.g., an SIM card). The cellular module 221 may perform at least some of the functions provided by the processor 210. The cellular module 221 may include a CP.

The WiFi module 223, the BT module 225, the GPS module 227, and the NFC module 228 each may include a processor for processing data received and transmitted through a corresponding module.

At least some (e.g., two or more) of the cellular module 221, the WiFi module 223, the BT module 225, the GPS module 227, and the NFC module 228 may be included in a single integrated chip (IC) or a single IC package.

The RF module 229 may transmit and receive communication signals (e.g., RF signals). The RF module 229 may include a transceiver, a Power Amp Module (PAM), a frequency filter, a Low Noise Amplifier (LNA), an antenna, etc.

At least one of the cellular module 221, the WiFi module 223, the BT module 225, the GPS module 227, and the NFC module 228 may transmit and receive an RF signal through a separate RF module.

The SIM 224 may include an embedded SIM, which includes a unique identification information (e.g., an Integrated Circuit Card Identifier (ICCID)) or subscriber information (e.g., International Mobile Subscriber Identity (IMSI)).

The memory 230 includes an internal memory 232 and an external memory 234. The internal memory 232 may include at least one of a volatile memory (e.g., a Dynamic Random Access Memory (DRAM), a Static Random Access Memory (SRAM), a Synchronous DRAM (SDRAM), etc.) and a non-volatile memory (e.g., a One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a flash memory (e.g., a NAND flash memory, a NOR flash memory, etc.), a hard drive, a solid state drive (SSD).

The external memory 234 may include a flash drive, for example, Compact Flash (CF), Secure Digital (SD), Micro-SD, Mini-SD, extreme-Digital (xD), a Multi Media Card (MMC), memory stick, etc. The external memory 234 may be functionally and/or physically connected with the electronic device 201 through various interfaces.

The sensor module 240 may measure a physical quantity or detect an operation state of the electronic device 201, and may convert measured or detected information into electric signals. The sensor module 240 includes a gesture sensor 240A, a gyro sensor 240B, an air (barometric) pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illumination sensor 240K, and an Ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor.

The sensor module 240 may further include a control circuit to control at least one sensor included therein.

The electronic device 201 may further include a processor configured to control the sensor module 240 as a part of the processor 210 or a separate part, and may control the sensor module 240 while the processor 210 is in a sleep state.

The input device 250 includes a touch panel 252, a (digital) pen sensor 254, a key 256, and an ultrasonic input device 258. The touch panel 252 may use at least one of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet.

The key 256 may include a physical button, an optical key, or a keypad.

The ultrasonic input device 258 may detect ultrasonic waves generated in an input tool through a microphone 288, and identify data corresponding to the detected ultrasonic waves.

The display 260 includes a panel 262, a hologram device 264, and a projector 266. The panel 262 may be implemented to be flexible, transparent, or wearable. The panel 262 may be configured as a single module along with the touch panel 252.

The hologram device 264 may show a stereoscopic image in the air using interference of light.

The projector 266 may display an image by projecting light onto a screen. The screen may be located inside or outside the electronic device 201.

The display 260 may further include a control circuit to control the panel 262, the hologram device 264, or the projector 266.

The interface 270 includes a High Definition Multimedia Interface (HDMI) 272, a Universal Serial Bus (USB) 274, an optical interface 276, and a D-subminiature (sub) 278. Additionally or alternatively, the interface 270 may include a Mobile High Definition Link (MHL) interface, a Secure Digital (SD) card/Multimedia Card (MMC) interface, or Infrared Data Association (IrDA) standard interface.

The audio module 280 may convert a sound and an electric signal bidirectionally. The audio module 280 may process sound information that is input or output through a speaker 282, a receiver 284, an earphone 286, and/or the microphone 288.

The camera module 291 photographs still and moving images. The camera module 291 may include one or more image sensors (e.g., a front surface sensor or a rear surface sensor), a lens, an Image Signal Processor (ISP), and a flash (e.g., a Light Emitting Diode (LED) or a xenon lamp).

The power management module 295 may manage power of the electronic device 201. The power management module 295 may include a Power Management IC (PMIC), a charger IC, and/or a battery gauge. The PMIC may have a wire charging method and/or a wireless charging method. The wireless charging method may include a magnetic resonance method, a magnetic induction method, or an electromagnetic wave method, and an additional circuit for charging wirelessly, e.g., a coil loop, a resonant circuit, a rectifier, etc., may be added. The battery gage may measure a remaining battery life of the battery 296, a voltage, a current, or temperature during charging. The battery 296 may be a rechargeable battery and/or a solar battery.

The indicator 297 may display a specific state of the electronic device 201 or a part of it (e.g., the processor 210), e.g., a booting state, a message state, or a charging state.

The motor 298 may convert an electric signal into a mechanical vibration, and cause a vibration or haptic effect.

The electronic device 201 may also include a processing device (e.g., a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device 201 may be comprised of one or more components, and the names of the elements may vary according to the type of the electronic device 201.

The electronic device 201 may include at least one of the above-described elements, and some of the elements may be omitted or an additional element may be further included. In addition, some of the elements of the electronic device 201 may be combined into a single entity, and may perform the same functions as those of the elements before being combined.

Figure 3:
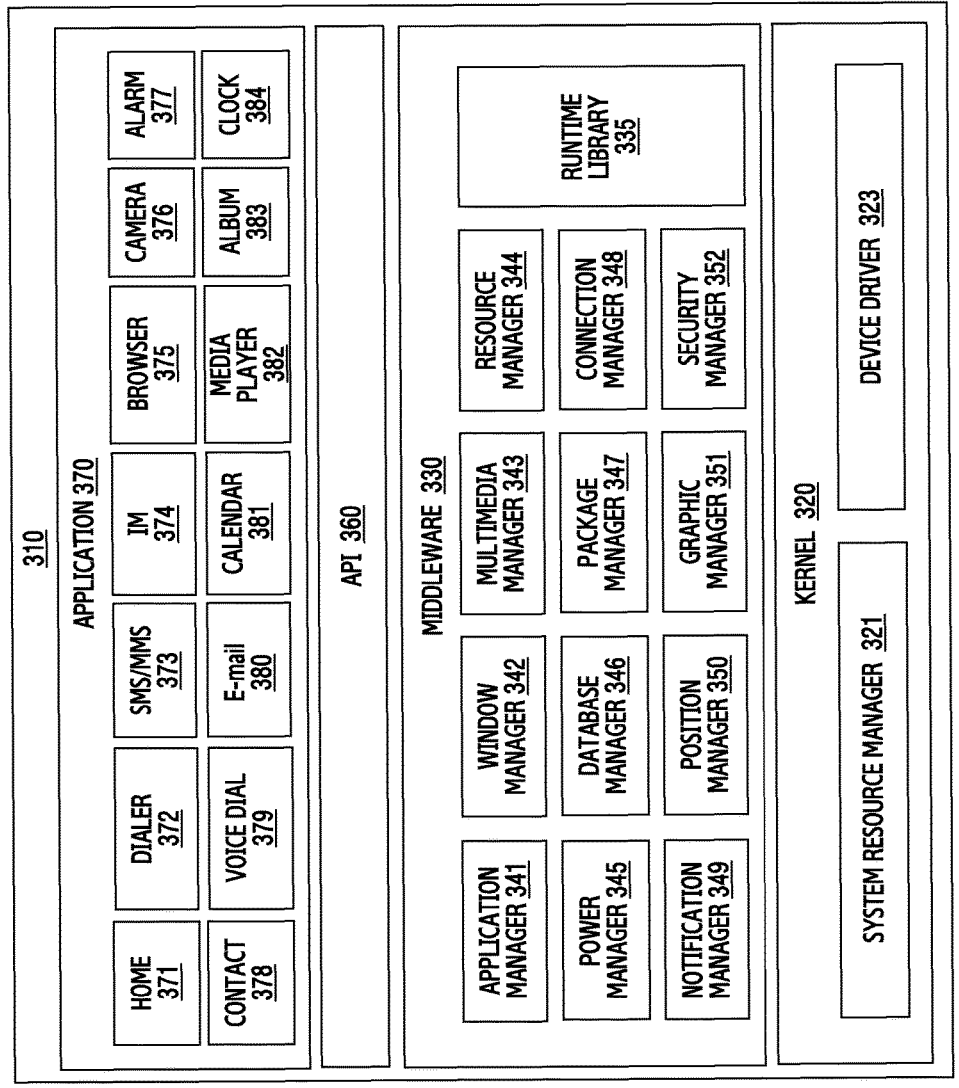
FIG. 3 illustrates a programming module according to an embodiment of the present disclosure.

FIG. 3 illustrates a program module according to an embodiment of the present disclosure.

Referring to FIG. 3, the program module 310 may include an OS for controlling resources related to an electronic device and/or various applications driven on the OS. For example, the OS may be Android®, iOS®, Windows®, Symbian®, Tizen®, Bada®, etc.

The program module 310 includes a kernel 320, middleware 330, an API 360, and applications 370. At least part of the program module 310 may be preloaded on the electronic device or downloaded from an external device.

The kernel 320 includes a system resource manager 321 and a device driver 323. The system resource manager 321 may control, allocate or collect the system resources. The system resource manager 321 may include a process manager, a memory manager, a file system manager, and the like. The device driver 323 may include a display driver, a camera driver, a Bluetooth driver, a shared memory driver, a USB driver, a keypad driver, a WiFi driver, an audio driver, and/or an Inter-Process Communication (IPC) driver.

The middleware 330 may provide functions that are commonly required by the applications 370 or may provide various functions to the applications 370 through the API 360, such that the applications 370 can effectively use limited system resources in the electronic device. The middleware 330 (includes a runtime library 335, an application manager 341, a window manager 342, a multimedia manager 343, a resource manager 344, a power manager 345, a database manager 346, a package manager 347, a connection manager 348, a notification manager 349, a position manager 350, a graphic manager 351, and a security manager 352.

The runtime library 335 may include a library module that is used by a compiler to add a new function through a programming language while the applications 370 are executed. The runtime library 335 may perform functions on input/output management, memory management, an arithmetic function, etc.

The application manager 341 may manage a life cycle of at least one of the applications 370.

The window manager 342 may manage GUI resources used in a screen.

The multimedia manager 343 manages formats for reproducing various media files and encodes or decodes the media files by using Codecs suited to the corresponding formats.

The resource manager 344 may manage resources such as a source code, a memory, or a storage space of at least one of the applications 370.

The power manager 345 operates along with a Basic Input/Output System (BIOS) to manage a battery or power, and to provide power information for operations of the electronic device.

The database manager 346 may generate, search, or change a database which is used in at least one of the applications 370.

The package manager 347 may manage installing or updating an application that is distributed in the form of a package file.

The connection manager 348 may manage wireless connection of WiFi, Bluetooth, etc.

The notification manager 349 may display or notify an event such as a message arrived, an appointment, and a notification of proximity.

The position manager 350 may manage location information of the electronic device.

The graphic manager 350 may manage a graphic effect to be provided to the user or a relevant user interface. For example, the graphic manager 351 may include a dynamic animation library (DALi) graphic engine.

The security manager 352 may provide an overall security function for system security or user authentication.

When the electronic device is equipped with a telephony function, the middleware 330 may further include a telephony manager to manage a speech or video telephony function of the electronic device.

The middleware 330 may include a middleware module to form a combination of the various functions of the above-described elements. The middleware 330 may provide a module that is customized according to a type of OS to provide a distinct function. In addition, the middleware 330 may dynamically delete some of the existing elements or may add new elements.

The API 360 is a set of API programming functions and may be provided as a different configuration according to an OS. For example, when using Android® or iOS®, a single API set may be provided for each platform. However, when using Tizen®, two or more API sets may be provided for each platform.

The applications 370 include a home application 371, a dialer application 372, a Short Message Service (SMS)/Multimedia Messaging Service (MMS) application 373, an Instant Message (IM) application 374, a browser application 375, a camera application 376, an alarm application 377, a contacts application 378, a voice dial application 379, an email application 380, a calendar application 381, a media player application 382, an album application 383, and a clock application 384. Additionally or alternatively, the applications 370 may include a health care application (e.g., an application for measuring exercise or blood sugar), or an application for providing environment information (e.g., information on atmospheric pressure, humidity, or temperature).

The applications 370 may include an application for supporting information exchange between the electronic device and an external electronic device (hereinafter, referred to as an "information exchange application"). The information exchange application may include a notification relay application for relaying specific information to an external electronic device or a device management application for managing an external electronic device.

The notification relay application may include a function of relaying notification information generated by other applications of the electronic device (e.g., the SMS/MMS application 373, the email application 380, the health care application, the environment information application, etc.) to an external electronic device. In addition, the notification relay application may receive notification information from an external electronic device and may relay the same to the user.

The device management application may manage (e.g., install, delete or update) at least one function of an external electronic device communicating with the electronic device (e.g., turning on/off an external electronic device (or some parts) or adjusting brightness (or resolution) of a display), an application operating in the external electronic device or a service provided by the external electronic device (e.g., a calling service or a message service).

The applications 370 may also include an application that is specified according to an attribute of an external electronic device.

The applications 370 may include an application received from an external electronic device.

The applications 370 may include a preloaded application or a third party application which may be downloaded from a server.

The names of the elements of the program module 310 in FIG. 3 may be changed according to a type of OS.

At least part of the program module 310 may be implemented by using software, firmware, hardware, or a combination thereof.

At least part of the program module 310 may be implemented (e.g., executed) by a processor.

At least part of the program module 310 may include a module, a program, a routine, sets of instructions, or a process to perform one or more functions.

Figure 4:
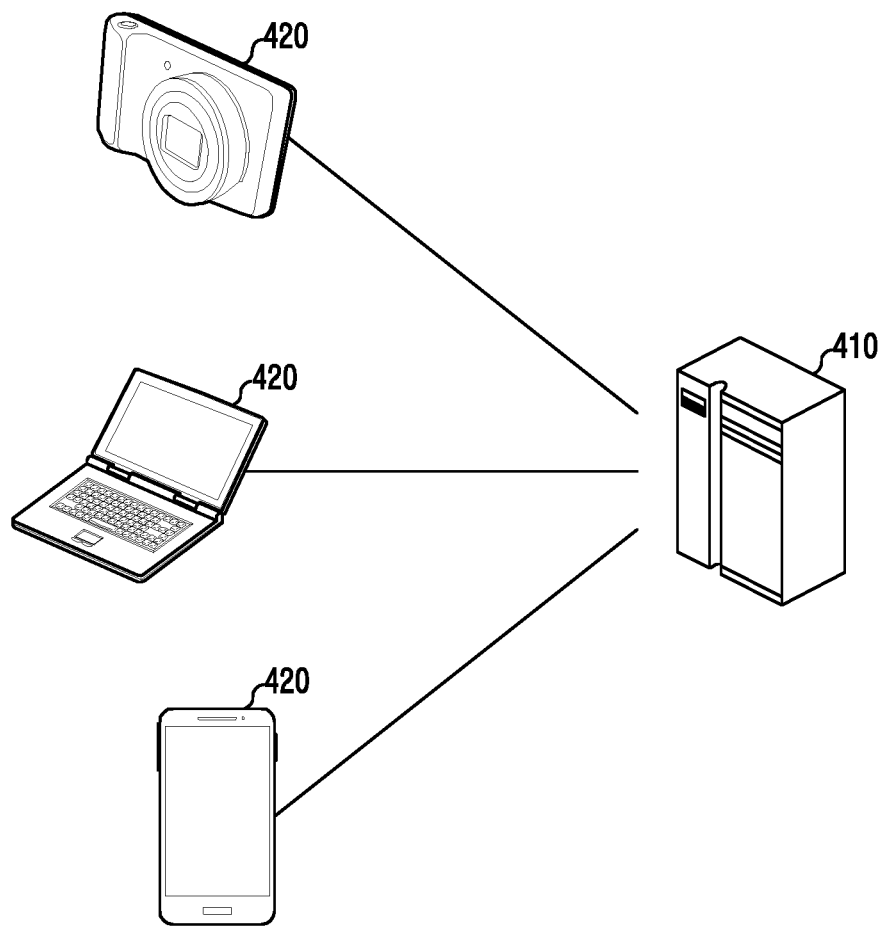
FIG. 4 illustrates a communication system according to an embodiment of the present disclosure.

FIG. 4 illustrates a communication system according to an embodiment of the present disclosure.

Referring to FIG. 4, the communication system includes an external device 410 and a plurality of electronic devices 420.

The external device 410 may provide a service to the electronic devices 420. For example, the external device 410 may be another electronic device or a server. The external device 410 may provide a Social Network Service (SNS). Accordingly, the external device 410 may manage SNS information.

The SNS information may include at least one piece of user information and posting information. The user information may include identification data and a profile image of each SNS user. The posting information may include images, tags of respective images, or explanation captions of respective images. The images may include still pictures and moving pictures.

The external device 410 may generate tags for the images and may manage the posting information according to each SNS user. The external device 410 may manage images in the form of one or more albums in accordance with each SNS user.

The electronic devices 420 may use the service through the external device 410. For example, the electronic devices 420 may use the SNS through the external device 410.

The electronic devices 420 may access the external device 410. For example, the electronic devices 420 may automatically or periodically access the external device 410.

Further, the electronic devices 420 may access the external device 410 by using the identification data on each SNS user. The electronic devices 420 may store the identification data on each SNS user. Further, the electronic devices 420 may upload images to the external device 410.

SNS users may post images to the external device 410 through the electronic devices 420. The SNS users may post the images by using identification data on each piece of identification data. The SNS users may attach a caption to each image.

Further, the electronic devices 420 may attach a tag to each image. The electronic devices 420 may extract tags from the caption. Alternatively, the SNS users may select items predefined in the external device 410 or input text through the tags in the electronic devices 420.

The electronic devices 420 may share interests or activities through the external device 410. For example, the electronic devices 420 may share images through the external device 410. In the electronic devices 420, the SNS users may share the images through the external device 410.

Each SNS user may use the SNS through the at least one electronic device 420. For example, each SNS user may use one electronic device 420 or a plurality of electronic devices 420.

Each SNS user may access the external device 410 by using each piece of identification information. Further, in each electronic device 420, each SNS user may post images to the external device 410 and attach tags.

Accordingly, the external device 410 may manage the posting information according to each SNS user. Further, each SNS user may download posting information from the external device 410 by using one of the electronic devices 420. That is, each SNS user may download the posting information corresponding to each piece of identification information. Accordingly, the electronic devices 420 may manage images, and may group and display the images.

Figure 5:
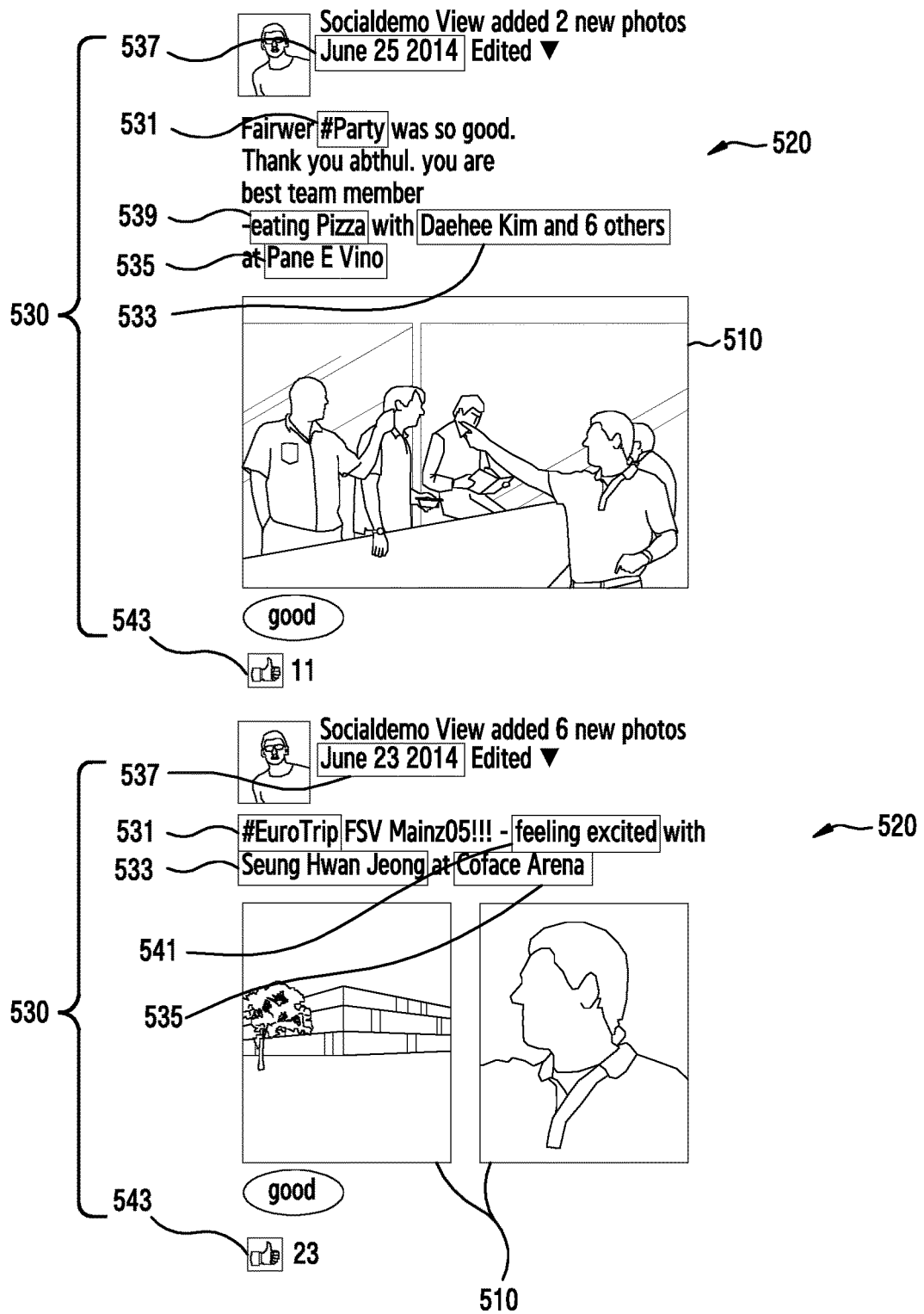
FIG. 5 illustrates an application of a service within a communication system according to an embodiment of the present disclosure.

FIG. 5 illustrates an application of a service within a communication system according to an embodiment of the present disclosure.

Referring to FIG. 5, an electronic device may post an image 510 to an external device. The electronic device may attach a caption 520 to the image 510. Further, when the caption 520 is attached to the image 510, the external device may extract tags 530 from the caption 520. Alternatively, the electronic device may extract the tags 530 from the caption 520.

When the image 510 and the caption 520 are received from the external device, the electronic device may extract the tags 530 from the caption 520. Attributes of the tags 530 may include at least one of a topic, people, location, date, activity, emotion, or response. According to the attributes, the tags 530 may be classified as a topic tag 531, a people tag 533, a location tag 535, a date tag 537, an activity tag 539, an emotion tag 541, or a response tag 543.

The external device or the electronic device may extract the topic tag 531 from text next to a hash tag (#) in the caption 520, may extract the date tag 537 from the caption 520 or a posted date, may extract the activity tag 539 together with text indicating an item of the corresponding activity, and may extract the response tag 543 based on the number of comments or the number of likes.

Figure 6:
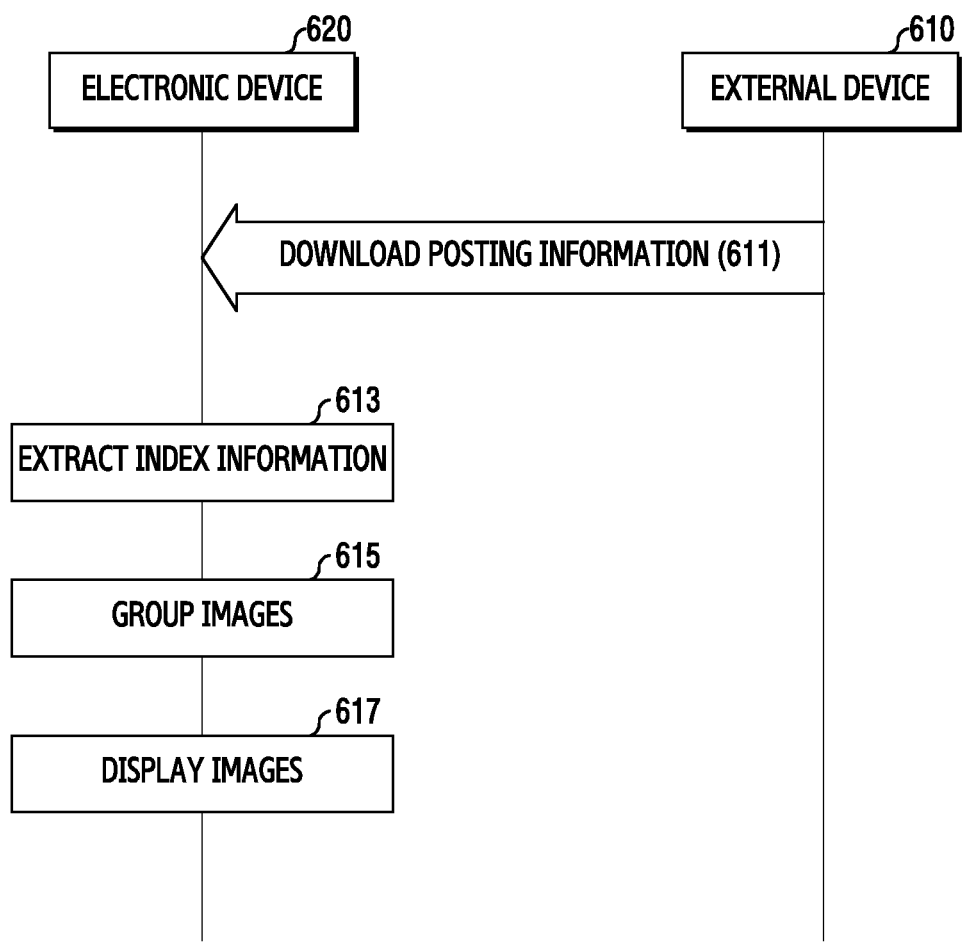
FIG. 6 is a signal flow diagram illustrating a method of displaying images according to an embodiment of the present disclosure.

FIG. 6 is a signal flow diagram illustrating a method of displaying images according to an embodiment of the present disclosure.

Referring to FIG. 6, an electronic device 620 downloads posting information from an external device 610 in operation 611. For example, the electronic device 620 may automatically or periodically access the external device 610. Further, the electronic device 620 may access the external device 610 by using the identification data on the user, i.e., the SNS user. Further, the electronic device 620 may download posting information corresponding to identification data. The posting information may include a plurality of images, tags of images, or explanation captions of images. If at least a part of the posting information is updated in the external device 610, the electronic device 620 may download the updated part in the posting information from the external device 610.

In operation 613, the electronic device 620 extracts index information, e.g., from the posting information. The index information may include one or more indexes. The electronic device 620 may extract the index from tags corresponding to each image or may extract at least one tag having set attributes as the index. For example, when at least one of the topic, people, location, date, activity, emotion, and response is set in the electronic device 620, the electronic device 620 may extract at least one of the topic tag, people tag, location tag, date tag, activity tag, emotion tag, and response tag from the tags, as the index.

In operation 615, the electronic device 620 groups images. For example, the electronic device 620 may group the images by using the index information. The electronic device 620 may classify the images into one or more groups by using one or more indexes, or may classify at least one image having the index among the images as a single group.

When the index information includes a plurality of indexes, the electronic device 620 may combine indexes and classify the images into at least one group. The electronic device 620 may classify at least one image having all indexes among the images to be a single group. Accordingly, the electronic device 620 may store the images according to each group.

In operation 617, the electronic device 620 displays images, e.g., displays the images according to each group.

Figure 7:
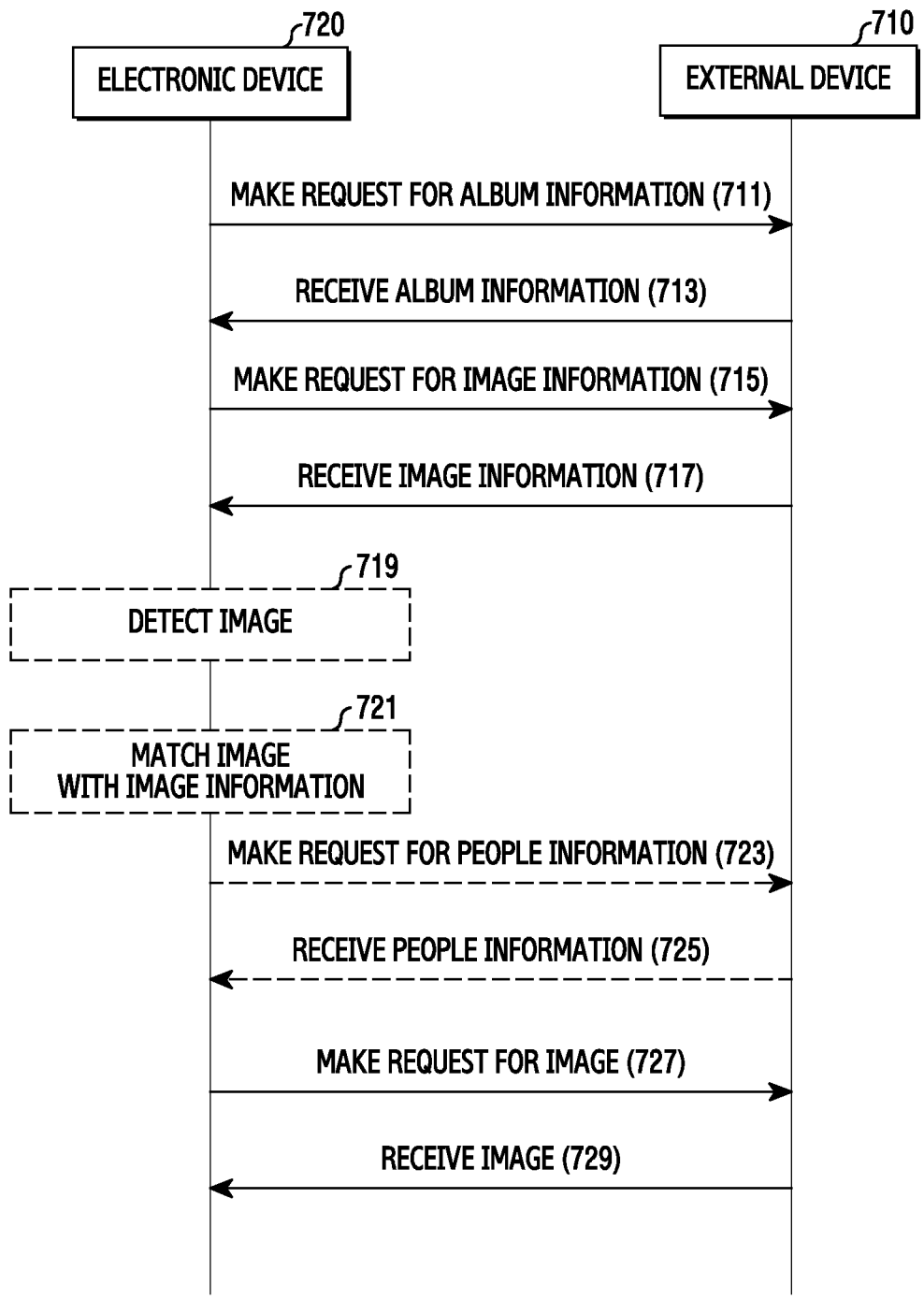
FIG. 7 is a signal flow diagram illustrating a posting information download operation according to an embodiment of the present disclosure.

FIG. 7 is a signal flow diagram illustrating a posting information download operation according to an embodiment of the present disclosure. For example, the operation illustrated in FIG. 7 could be performed during operation 611 illustrated in FIG. 6.

Referring to FIG. 7, an electronic device 720 requests album information from an external device 710 in operation 711. For example, the electronic device 720 may request the album information by transmitting identification data on the user, i.e., the SNS user.

In operation 713, the electronic device 720 receives the album information from the external device 710. For example, when receiving the identification data from the electronic device 720, the external device 710 may detect at least one album according to the identification data, and may transmit the album information to the electronic device 720. The album information may include at least one of an identifier, name, generation time, and update time according to each album.

In operation 715, the electronic device 720 requests image information from the external device 710. For example, the electronic device 720 may request the image information by transmitting an identifier of the album to the external device 710.

When a plurality of albums are detected by the external device 710 in operation 713, the electronic device 720 may select one of the albums and make a request for image information for the selected album.

In operation 717, the electronic device 720 receives the image information from the external device 710.

In operation 719, the external device 710 detects an image within the corresponding album according to an identifier. For example, the electronic device 720 may detect the image by analyzing the image information. The electronic device 720 may detect the images through an identifier according to each image. The user of the electronic device 720 may simultaneously post a plurality of images to the external device 710. In this case, the electronic device 720 may identify the images through an identifier according to each image.

The image information may include at least one of an identifier, address, explanation caption, size, location coordinate, location name, comment, response and tags according to each image. Further, attributes of the tags may include at least one of a topic, people, location, date, activity, emotion, and response. That is, the tags may be classified as one of a topic tag, people tag, location tag, date tag, activity tag, emotion tag, and response tag according to the attributes.

In operation 721, the electronic device 720 matches an image with image information. For example, the electronic device 720 may match the detected image with the image information by analyzing the image information. When the user of the electronic device 720, i.e., the SNS user, simultaneously posts a plurality of images to the external device 710, the electronic device 720 may match the images with the same image information. The electronic device 720 may match the images with the same size, location coordinate, location name, comment, and tags.

In operation 723, the electronic device 720 requests people information from the external device 710. For example, the electronic device 720 may detect one or more people from the image information or may detect one or more people from tags, i.e., may detect one or more people tags from the tags. Further, the electronic device 720 may request the people information by transmitting the people tag to the external device 710.

In operation 725, the electronic device 720 receives the people information from the external device 710. For example, when receiving the people tag from the electronic device 720, the external device 710 detects the people information according to the people tag. The external device 710 may detect user information as the people information according to the people tag, and may transmit the people information to the electronic device 720.

In operation 727, the electronic device 720 requests images from the external device 410. For example, the electronic device 720 may request the images by transmitting identifiers of the images to the external device 710.

In operation 729, the electronic device 720 receives the images from the external device 710. When receiving the identifiers of the images from the electronic device 720, the external device 710 may detect the images according to the identifiers. Further, the external device 710 may transmit the images to the electronic device 720.

Figure 8:
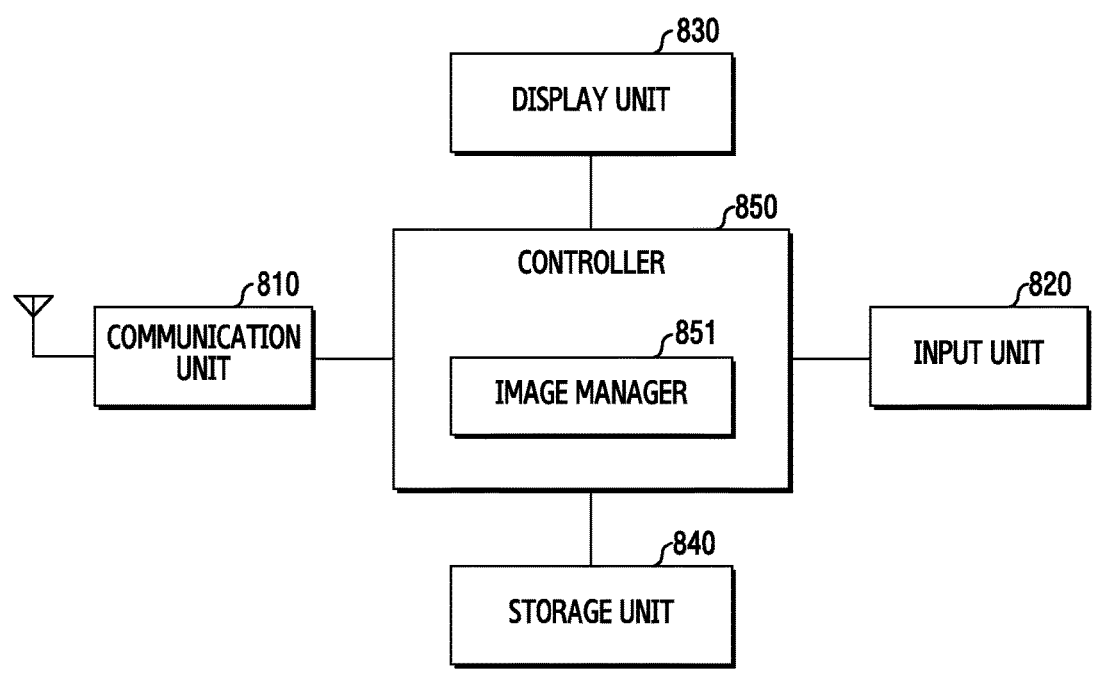
FIG. 8 illustrates an image display device according to an embodiment of the present disclosure.

FIG. 8 illustrates an electronic device according to an embodiment of the present disclosure.

Referring to FIG. 8, the electronic device includes a communication unit 810, an input unit 820, a display unit 830, a storage unit 840, and a controller 850.

The communication unit 810 may perform communication in the electronic device. For example, the communication unit 810 may communicate with an external device through various communication schemes. The communication unit 810 may perform at least one of wireless communication and wired communication. To this end, the communication unit 810 may access at least one of a mobile communication network and a data communication network. Alternatively, the communication unit 810 may perform short range communication. The external device may include an electronic device, a base station, a server, and a satellite.

The communication schemes may include LTE, WCDMA, GSM, Wi-Fi, Bluetooth, NFC, etc.

The input unit 820 generates input data in the electronic device. For example, the input unit 820 may generate input data in response to a user input of the electronic device. The input unit 820 may include at least one input device. The input unit 820 may include a key pad, a dome switch, a physical button, a touch panel, a jog & shuttle, a sensor, etc.

The display unit 830 may output a display screen, which may include at least one of an image and text. The display unit 830 may include an LCD, an LED display, an OLED display, a MEMS display, and an electronic paper display. The display unit 830 may include a plurality of LEDs. The display unit 830 may also be coupled with the input unit 820 to be implemented as a touch screen.

The storage unit 840 may store operation programs of the electronic device. For example, the storage unit 840 may store a program for grouping a plurality of images according to a user input. Further, the storage unit 840 may store data generated while programs are executed. In addition, the storage unit 840 may include an image database and a tag database. The image database may store a plurality of images and the tag database may store tags corresponding to the images.

The controller 850 may control the general operation in the electronic device. For example, the controller 850 may download posting information through the communication unit 810. The posting information may include a plurality of images, tags corresponding to respective images, or explanation captions corresponding to respective images. The controller 850 may include the image manager 851. The image manager 851 may group images, i.e., the image manager 851 may classify the images into one or more groups, e.g., by using tags. When the posting information includes a caption corresponding to each image, the image manager 851 may extract tags from the caption.

Similar to the electronic device illustrated in FIG. 8, an external device may also include the storage unit 840 and the controller 850. For example, the external device may store a program for grouping a plurality of images. Further, the external device may include an image database and a tag database. When the external device stores the program for grouping a plurality of images, the external device may group images and provide the grouped images to the electronic device.

Figure 9:
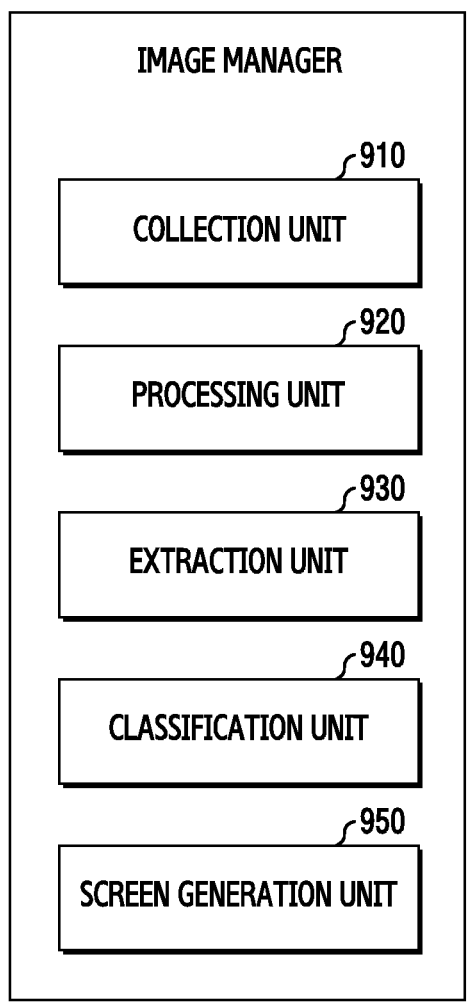
FIG. 9 illustrates an image manager according to an embodiment of the present disclosure.

FIG. 9 is a block diagram of an image manager according to an embodiment of the present disclosure. For example, the image manager illustrated in FIG. 9 may be substituted for the image manager 851 illustrated in FIG. 8.

Referring to FIG. 9, the image manager includes a collection unit 910, a processing unit 920, an extraction unit 930, a classification unit 940, and a screen. The collection unit 910 may collect images and tags from the posting information. For example, the collection unit 910 may detect images and tags from the posting information.

The processing unit 920 may process images and tags. For example, the processing unit 920 may store images and tags in a storage unit.

The processing unit 920 may remove at least one of the images. For example, if an original image of at least one of the images is stored in the storage unit, the processing unit 920 may delete at least one of the images. Further, the processing unit 920 may replace at least one of the images with the original image of the storage unit. The processing unit 920 may remove at least one of the tags according to one of the images. That is, when at least two of the tags are the same, the processing unit 920 may delete at least one of the tags according to one of the images.

The extraction unit 930 may extract index information from the posting information. For example, the extraction unit 930 may extract the index from tags according to each image. The extraction unit 930 may extract at least one tag having set attributes as the index. Further, the extraction unit 930 may change index information based on a user input. For example, the extraction unit 930 may add another index to the index information, and delete or modify the index of the index information.

Alternatively, the extraction unit 930 may compare and analyze indexes of the images. The extraction unit 930 may determine a sameness or similarity between the indexes of the images. For example, when the extraction unit 930 extracts indexes of "At Barcelona" "At Barcelona, Spain", and "At Barcelona in Spain" from location tags of the images, the extraction unit 930 may determine a similarity between the indexes of the images. When it is determined that the indexes of the images are similar, the extraction unit 930 may change "At Barcelona, Spain" and "At Barcelona in Spain" to "At Barcelona".

The classification unit 940 may group the images. For example, the classification unit 940 may group the images by using index information. The classification unit 940 may classify the images into one or more groups by using one or more indexes. The classification unit 940 may classify at least one image having the index among the images to be a single group. When the index information includes a plurality of indexes, the classification unit 940 may combine the indexes and classify the images into at least one group. The classification unit 940 may classify at least one image having all indexes among the images to be a single group.

The screen generation unit 950 may generate an image group screen with images. For example, the screen generation unit 950 may generate the image group screen to display images according to each group.

Figure 10:
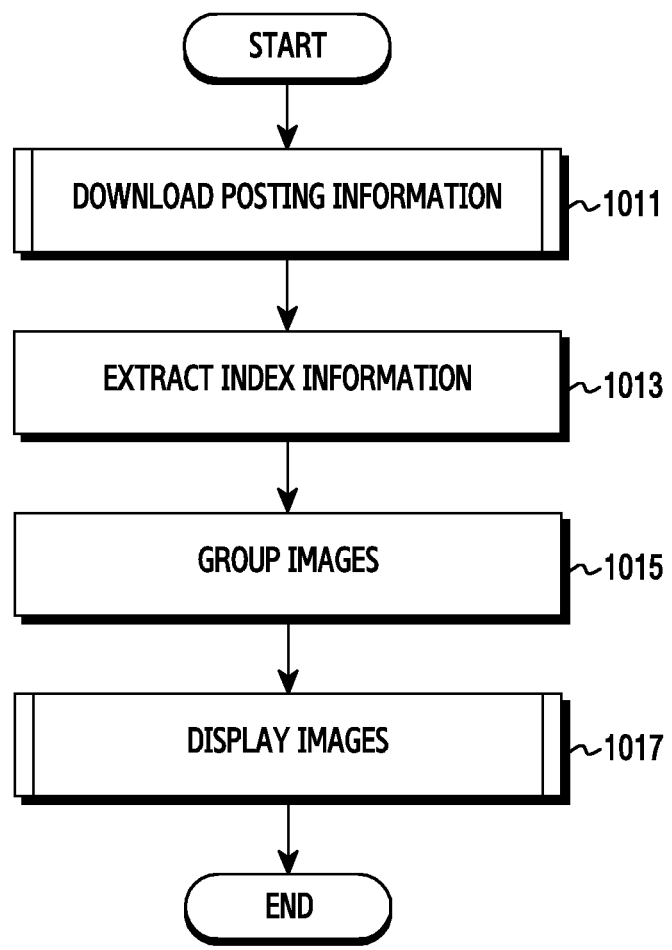
FIG. 10 is a flowchart illustrating an image display method according to an embodiment of the present disclosure.

FIG. 10 is a flowchart illustrating an image display method of an electronic device according to an embodiment of the present disclosure. Referring to FIG. 10, in step 1011, the electronic device downloads posting information. For example, the electronic device may access an external device by using identification data of a user, i.e., an SNS user. Further, the electronic device may download posting information corresponding to identification data. The posting information may include a plurality of images and tags according to each image. Further, the electronic device may download a profile image of the SNS user corresponding to a people tag among the tags according to each image.

The electronic device may detect images and tags from the posting information. Attributes of the tags may include at least one of a topic, people, location, date, activity, emotion, and response. That is, the tags may be classified to be at least one of a topic tag, people tag, location tag, date tag, activity tag, emotion tag, and response tag according to the attributes. For example, the electronic device may detect images and tags according to each image as shown in Table 1 below. Further, the electronic device may store images and tags in a storage unit. The electronic device may remove at least one of the images.

When the posting information includes images and tags according to each image, the electronic device may divide the tags according to attributes thereof as shown in Table 1 below. Alternatively, when the posting information includes images and a caption according to each image, the electronic device may extract tags from the caption. The electronic device may distinguish between tags according to attributes thereof as shown in Table 1 below. For example, the electronic device may extract a date tag, a topic tag, a people tag, a location tag, and an activity tag according to an image "00002". The electronic device may extract a date tag "2012.07.13" from a posting date "Jul. 13 2012". Further, the electronic device may extract a topic tag "#Party", an activity tag "Drinking Beer", a people tag "With James", and a location tag "At Samsung Electronics central gate" from a caption "Party we were glad to see again—drinking Beer with James at Samsung Electronics central gate". In such a manner, the electronic device may detect tags of images from "00001" to "00010".

TABLE 1

| Image identifier | 00001 | 00002 | 00003 | 00004 | 00005 |
|---|---|---|---|---|---|
| Date tag | 2010.06.08 | 2012.07.13 | 2013.09.10 | 2014.02.12 | 2014.09.11 |
| Topic tag | #EuroTrip | #Party | #EuroTrip | #EuroTrip, #Biztrip | #Biztrip |

TABLE 1-continued

| People tag | With James, Peter | With James | With Lisa | With Tom | With Tom |
|---|---|---|---|---|---|
| Location tag | At Barcelona | At Samsung Electronics central gate | At Barcelona | At Barcelona | At New York |
| Activity tag | Eating Pizza | Drinking Beer | Drinking Beer | | |
| Emotion tag | feeling excited | | feeling happy | feeling happy | feeling excited |
| Image identifier | 00006 | 00007 | 00008 | 00009 | 00010 |
| Date tag | 2014.07.13 | 2014.11.13 | 2015.01.11 | 2015.01.30 | 2015.01.01 |
| Topic tag | #WorkShop | #Sports, #Biztrip | #Exercise, #Sports | #Party | #Party |
| People tag | With James | With Tom | With Sam | With Tom | With Lisa |
| Location tag | At Samsung Electronics central gate | At Hyde Park | At Kwanggyo lake park | At AAA Restaurant | At Beer Factory |
| Activity tag | Eating Pizza | Running | Running | Eating Pizza | Drinking Beer |
| Emotion tag | feeling excited | | feeling happy | feeling exicted | |

Figure 11:
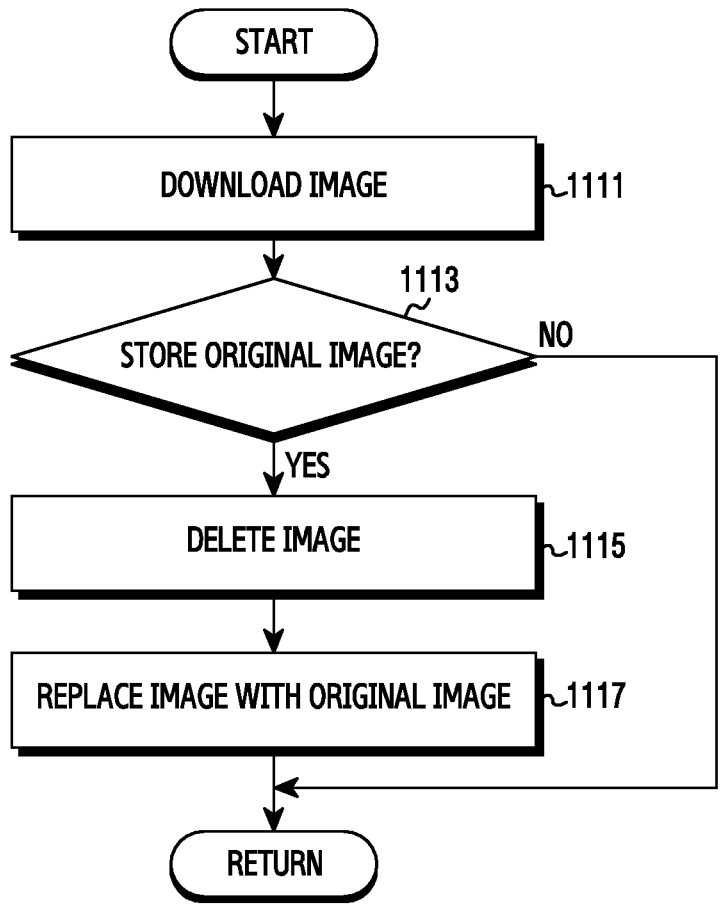
FIG. 11 is a flowchart illustrating a posting information download operation according to an embodiment of the present disclosure.

FIG. 11 is a flowchart illustrating a method of downloading posting information according to an embodiment of the present disclosure. For example, the method illustrated in FIG. 11 can be performed during step 1011 of FIG. 10.

Referring to FIG. 11, the electronic device downloads an image in step 1111. The image may be resized from an original image. For example, the image may be downloaded as a thumbnail image.

The electronic device determines whether the original image of the image is stored in the storage unit in step 1113. That is, the electronic device may determine whether the image is the same as the image pre-stored in the storage unit.

When it is determined that the original image of the image is stored in the storage unit in step 1113, the electronic device deletes the image in step 1115. That is, when the image is the same as the image pre-stored in the storage unit, the electronic device may delete the image.

In step 1117, the electronic device replaces the image with the original image. The electronic device may match image information with the original image. That is, the electronic device may match identification data on the image with the original image.

However, when it is determined that the original image of the image is not stored in the storage unit in step 1113, the electronic device does not delete the image, and the downloading is completed.

Referring again to FIG. 10, the electronic device extracts index information in step 1013. For example, the electronic device may extract the index information from the posting information. The index information may include one or more indexes. The electronic device may extract the index from tags corresponding to each image or may extract at least one tag having set attributes among the tags as the index. That is, at least one of the attributes of the tags may be preset to extract the index.

For example, when one of the topic, people, location, date, activity, emotion, and response is set, the electronic device may extract one of the topic tag, people tag, location tag, date tag, activity tag, emotion tag, and response tag from the tags, as the index. Alternatively, when two of the topic, people, location, date, activity, emotion, and response are set, the electronic device may extract two of the topic tag, people tag, location tag, date tag, activity tag, emotion tag, and response tag from the tags, as the indexes. Similarly, when three of the topic, people, location, date, activity, emotion, and response are set, the electronic device may extract three of the topic tag, people tag, location tag, date tag, activity tag, emotion tag, and response tag from the tags, as the indexes.

In step 1015, the electronic device group images. For example, the electronic device may group the images by using index information. The electronic device may classify the images into one or more groups by using one or more indexes. The electronic device may classify at least one image having the index among the images to be a single group. Thereafter, the electronic device may store the images according to each group.

When the index information includes one index, the electronic device may group the images. For example, the electronic device may group the images according to one of the date tag, topic tag, people tag, location tag, activity tag, emotion tag, and response tag as shown in Table 2 below.

For example, when the index of the index information is the date tag, the electronic device may group images from "00001" to "00010" according to the date tag. That is, date tags of the images "00002" and "00006" have the same month and date of "07.13", so that the electronic device may classify the images "00002" and "00006" as a single group. Further, because date tags of the images "0001", "00003", "00004", "00005", "00007", "00008", "00009", and "00010" all have different dates, the electronic device may classify the images "0001", "00003", "00004", "00005", "00007", "00008", "00009" and "00010" to be different single groups, respectively. In such a mariner, the electronic device may classify the images from "00001" to "00010" by using the index.

When the index information includes a plurality of indexes, the electronic device may combine the indexes and classify the images into at least one group. For example, the electronic device may classify at least one image having all indexes among the images to be a single group. The electronic device may group the images according to two of the date tag, topic tag, people tag, location tag, activity tag, emotion tag, and response tag as shown in Table 3 below.

For example, when the indexes of the index information are the topic tag and the location tag, the electronic device may combine the topic tag and the location tag to classify the images from "00001" to "00010". That is, because the images "00001", "00003", and "00004" are the same topic tag of "# EuroTrip" and the same location tag of "At Barcelona", the electronic device may classify the images "00001", "00003", and "00004" as a single group.

Further, because the images "00002", and "00005" to "00010" all have different combinations of the topic tag and the location tag, the electronic device may classify the images "00002", and "00005" to "00010" as different single groups. In such a manner, the electronic device may classify the images from "00001" to "00010" by using the indexes.

TABLE 2

| Index | | Group | Image identifier | Index | | Group | Image identifier |
|---|---|---|---|---|---|---|---|
| Date tag | 06.08 | 1 | 00001 | Location tag | At Barcelona | 1 | 00001, 00003, 00004 |
| | 07.13 | 2 | 00002, 00006 | | | | |
| | 09.10 | 3 | 00003 | | At Samsung Electronics central gate | 2 | 00002, 00006 |
| | 02.12 | 4 | 00004 | | | | |
| | 09.11 | 5 | 00005 | | | | |
| | 11.13 | 6 | 00007 | | At New York | 3 | 00005 |
| | 01.11 | 7 | 00008 | | | | |
| | 01.30 | 8 | 00009 | | At Hyde Park | 4 | 00007 |
| | 01.01 | 9 | 00010 | | | | |
| | | | | | At Gwanggyo lake park | 5 | 00008 |
| | | | | | At AAA Restaurant | 6 | 00009 |
| | | | | | At Beer Factory | 7 | 00010 |
| Topic tag | #EuroTrip | 1 | 00001, 00003, 00004 | Activity tag | Eating Pizza | 1 | 00001, 00006, 00009 |
| | #Party | 2 | 00002, 00009, 00010 | | Drinking Beer | 2 | 00002, 00003, 00010 |
| | #Biztrip | 3 | 00004, 00005, 00007 | | Running | 3 | 00007, 00008 |
| | #WorkShop | 4 | 00006 | | others | | 00004, 00005 |
| | #Sports | 5 | 00007, 00008 | Emotion tag | feeling excited | 1 | 00001, 00005, 00006, 00009 |
| | #Exercise | 6 | 00008 | | | | |
| People tag | With James | 1 | 00001, 00002, 00006 | | feeling happy | 2 | 00003, 00004, 00008 |
| | With Peter | 2 | 00001 | | | | |
| | With Lisa | 3 | 00003, 00010 | | others | | 00002, 00007, 00010 |
| | With Tom | 4 | 00004, 00005, 00007, 00009 | | — | — | — |
| | With Sam | 5 | 00008 | | | | |

TABLE 3

| Index combination | | Group | Image identifier | Index combination | | Group | Image identifier |
|---|---|---|---|---|---|---|---|
| Date tag + topic tag | 06.08, #EuroTrip | 1 | 00001 | Topic tag + emotion tag | #EuroTrip, feeling excited | 1 | 00001 |
| | 07.13, #Party | 2 | 00002 | | #EuroTrip, feeling happy | 2 | 00003, 00004 |
| | 09.10, #EuroTrip | 3 | 00003 | | | | |
| | 02.12, #EuroTrip, #Biztrip | 4 | 00004 | | #BizTrip, feeling happy | 3 | 00004 |
| | 09.11, #Biztrip | 5 | 00005 | | #BizTrip, feeling excited | 4 | 00005 |
| | 07.13, #WorkShop | 6 | 00006 | | | | |
| | 11.13, #WorkShop | 7 | 00007 | | #WorkShop, feeling excited | 5 | 00006 |
| | 01.11, #Sports, #Biztrip | 8 | 00008 | | #Exercise, Sports, feeling happy | 6 | 00008 |
| | 01.30, #Party | 9 | 00009 | | | | |
| | 01.01, #Party | 10 | 00010 | | #Party, feeling excited | 7 | 00009 |

TABLE 3-continued

| Index combination | | Group | Image identifier | Index combination | | Group | Image identifier |
|---|---|---|---|---|---|---|---|
| Date tag + people tag | 06.08, With James, Peter | 1 | 00001 | | others | | 00002, 00007, 00010 |
| | 07.13, With James | 2 | 00002, 00006 | | | | |
| | 09.10, With Lisa | 3 | 00003 | | | | |
| | 02.12, With Tom | 4 | 00004 | People tag + location tag | With James, Peter, At Barcelona | 1 | 00001 |
| | 07.13, With James | 5 | 00005 | | With James, At Samsung Electronics central gate | 2 | 00002, 00006 |
| | 11.13, With Tom | 6 | 00007 | | | | |
| | 01.11, With Sam | 7 | 00008 | | With Lisa, At Barcelona | 3 | 00003 |
| | 01.30, With Tom | 8 | 00009 | | With Tom, At Barcelona | 4 | 00004 |
| | 01.01, With Lisa | 9 | 00010 | | With Tom, At New York | 5 | 00005 |
| Date tag + location tag | 06.08, At Barcelona | 1 | 00001 | | | | |
| | 07.13, At Samsung Electronics central gate | 2 | 00002, 00006 | | With Tom, At Hyde Park | 6 | 00007 |
| | 09.10, At Barcelona | 3 | 00003 | | With Tom, At Gwanggyo lake park | 7 | 00008 |
| | 02.12, At Barcelona | 4 | 00004 | | With Tom, At AAA Restaurant | 8 | 00009 |
| | 09.11, At New York | 5 | 00005 | | With Lisa, At Beer Factory | 9 | 00010 |
| | 11.13, At Hyde Park | 6 | 00007 | | | | |
| | 01.11, At Gwanggyo lake park | 7 | 00008 | People tag + activity tag | With James, Eating Pizza | 1 | 00001, 00006 |
| | 01.30, At AAA Restaurant | 8 | 00009 | | With Peter, Eating Pizza | 2 | 00001 |
| | 01.01, At Beer Factory | 9 | 00010 | | With James, Drinking Beer | 3 | 00002 |
| Date tag + activity tag | 06.08, Eating Pizza | 1 | 00001 | | With Lisa, Drinking Beer | 4 | 00003, 00010 |
| | 07.13, Drinking Beer | 2 | 00002 | | With Tom, Running | 5 | 00007 |
| | 09.10, Drinking Beer | 3 | 00003 | | With Sam, Running | 6 | 00008 |
| | 07.13, Eating Pizza | 4 | 00006 | | With Tom, Eating Pizza | 7 | 00009 |
| | 11.13, Running | 5 | 00007 | | others | | 00004, 00005 |
| | 01.11, Running | 6 | 00008 | | | | |
| | 01.30, Eating Pizza | 7 | 00009 | | | | |
| | 01.01, Drinking Beer | 8 | 00010 | | | | |
| | others | | 00004, 00005 | | | | |
| Date tag + emotion tag | 06.08, feeling excited | 1 | 00001 | People tag + emotion tag | With James, feeling excited | 1 | 00001, 00006 |
| | 09.10, feeling happy | 2 | 00003 | | With Peter, feeling excited | 2 | 00001 |
| | 02.12, feeling happy | 3 | 00004 | | With Lisa, feeling happy | 3 | 00003 |
| | 09.11, feeling excited | 4 | 00005 | | With Tom, feeling happy | 4 | 00004 |

TABLE 3-continued

| Index combination | | Group | Image identifier | Index combination | | Group | Image identifier |
|---|---|---|---|---|---|---|---|
| | 07.13, feeling excited | 5 | 00006 | | With Tom, feeling excited | 5 | 00005, 00009 |
| | 01.11, feeling happy | 6 | 00008 | | With Sam, feeling happy | 6 | 00008 |
| | 01.30, feeling excited | 7 | 00009 | | others | 7 | 00002, 00007, 00010 |
| | others | | 00002, 00007, 00010 | Location tag + activity tag | At Barcelona, Eating Pizza | 1 | 00001 |
| Topic tag + people tag | #EuroTrip, With James, Peter | 1 | 00001 | | At Samsung Electronics central gate, Drinking Beer | 2 | 00002 |
| | #Party, With James | 2 | 00002 | | | | |
| | #EuroTrip, With Lisa | 3 | 00003 | | At Barcelona, Drinking Beer | 3 | 00003 |
| | #EuroTrip, With Tom | 4 | 00004, 00007 | | | | |
| | #Biztrip, With Tom | 5 | 00004, 00005 | | At Samsung Electronics central gate, Eating Pizza | 4 | 00006 |
| | #WorkShop, With James | 6 | 00006 | | | | |
| | #Sports, With Tom | 7 | 00007 | | At Hyde Park, Running | 5 | 00007 |
| | #Exercise, #Sports, With Sam | 8 | 00008 | | At Gwanggyo lake park, Running | 6 | 00008 |
| | #Party, With Tom | 9 | 00009 | | At AAA Restaurant, Eating Pizza | 7 | 00009 |
| | #Party, With Lisa | 10 | 00010 | | At Beer Factory, Drinking Beer | 8 | 00010 |
| | | | | | others | | 00004, 00005 |
| Topic tag + location tag | #EuroTrip, At Barcelona | 1 | 00001, 00003, 00004 | Location tag + emotion tag | At Barcelona, feeling excited | 1 | 00001 |
| | #Party, At Samsung Electronics central gate | 2 | 00002 | | At Barcelona, feeling happy | 2 | 00003, 00004 |
| | #Biztrip, At Barcelona | 3 | 00004 | | At New York, feeling excited | 3 | 00005 |
| | #Biztrip, At New York | 4 | 00005 | | | | |
| | #WorkShop, At Samsung Electronics central gate | 5 | 00006 | | At Samsung Electronics central gate, Feeling excited | 4 | 00006 |
| | #Sports, #Biztrip, At Hyde Partk | 6 | 00007 | | | | |
| | #Exercise, #Sports, At Gwanggyo lake park | 7 | 00008 | | At Gwanggyo lake park, feeling happy | 5 | 00008 |
| | | | | | At AAA Restaurant, feeling excited | 6 | 00009 |
| | | | | | others | | 00002, 00007, 00010 |
| | #Party, At AAA Restaurant | 8 | 00009 | Activity tag + emotion tag | Eating Pizza, feeling excited | 1 | 00001, 00006, 00009 |
| | #Party, At Beer Factory | 9 | 00010 | | Drinking Beer, | 2 | 00003 |

TABLE 3-continued

| Index combination | | Group | Image identifier | Index combination | Group | Image identifier |
|---|---|---|---|---|---|---|
| Topic tag + activity tag | #EuroTrip, Eating Pizza | 1 | 00001 | feeling happy Running, Feeling happy others | 3 | 00008 |
| | #Party, Drinking Beer | 2 | 00002, 00010 | | 4 | 00002, 00004, 00005, 00007, 00010 |
| | #EuroTrip, Drinking Beer | 3 | 00003 | | | |
| | #Workshop, Eating Pizza | 4 | 00006 | | | |
| | #Sports, Running | 5 | 00007, 00008 | — | — | — |
| | #Biztrip, Running | 6 | 00007 | — | — | — |
| | #Exercise, Running | 7 | 00008 | — | — | — |
| | #Party, Eating Pizza | 8 | 00009 | | | |
| | others | | 00004, 00005 | | | |

The electronic device may generate a name of the group. For example, the electronic device may generate the name of the group by using tags. The electronic device may generate the name of the group by using at least one tag having set attributes among the tags. That is, at least one of the attributes of the tags may be preset to generate the name of the group. Further, when images are classified into a plurality of groups, the electronic device may generate a name of each group by applying the same rule to the plurality of groups.

The electronic device may also generate a name of each group by using an image or sound related to at least one of the tags. Alternatively, the electronic device may generate the name of each group by listing at least one of the tags. Accordingly, the electronic device may generate the name of each group in a sentence form and generate a story line based on the name of each group.

For example, when images are grouped according to one of the date tag, topic tag, people tag, location tag, activity tag, emotion tag, and response tag, the electronic device may generate the name of the group by using at least one of the date tag, topic tag, people tag, location tag, activity tag, emotion tag, and response tag as shown in Table 4 below.

When the images are grouped according to the topic tag, the electronic device may generate a name of a first group by using one of date tags, topic tags, people tags, location tags, activity tags, and emotion tags of the images "00001", "00003", and "00004". The electronic device may generate "Eating Pizza, Drinking Beer" as the name of the first group by listing the activity tags "Eating Pizza" and "Drinking Beer" of the images "00001", "00003", and "00004" of the first group. Alternatively, when the images are grouped according to the topic tag, the electronic device may generate a name of a first group by combining two of the date tags, topic tags, people tags, location tags, activity tags, and emotion tags of the images "00001", "00003", and "00004" of the first group. The electronic device may generate "EuroTrip, Biztrip with James, Peter, Lisa, Tom" as the name of the first group by combining the topic tags "EuroTrip" and "Biztrip" and the people tags "With James, Peter", "With Lisa", and "With Tom" of the images "00001", "00003", and "00004" of the first group. Selectively, the electronic device may omit a part of at least one of the topic tags or people tags and express " . . . " for the omitted part.

When the images are grouped according to two of the date tag, topic tag, people tag, location tag, activity tag, emotion tag, and response tag, the electronic device may generate the name of the group by using at least one of the date tag, topic tag, people tag, location tag, activity tag, emotion tag, and response tag as shown in Table 5 below.

When the images are grouped according to the date tag and the people tag, the electronic device may generate a name of a second group by using one of date tags, topic tags, people tags, location tags, activity tags, and emotion tags of the images "00002" and "00006" of the second group. The electronic device may generate "Party, Workshop" as the name of the second group by listing the topic tags "Party" and "Workshop" of the images "00002" and "00006" of the second group.

When the images are grouped according to the date tag and the people tag, the electronic device may generate a name of a second group by combining three of date tags, topic tags, people tags, location tags, activity tags, and emotion tags of the images "00002" and "00006" of the second group. The electronic device may generate "Party, Workshop, drinking Beer . . . with James" as the name of the second group by combining the topic tags "Party" and "Workshop", the activity tags "Eating Pizza", and the people tags "With James" of the images "00002" and "00006" of the second group. Selectively, the electronic device may omit a part of at least one of the topic tags, the activity tags, or the people tags and express " . . . " for the omitted part.

TABLE 4

| Index | Group | Number of tags | Group name |
|---|---|---|---|
| Date tag | 1 | 1 | 06.08<br>EuroTrip<br>With James, Peter<br>At Barcelona<br>Eating Pizza<br>Feeling excited |
| | | 2 | 06.08 EuroTrip<br>06.08 with James, Peter<br>06.08 at Barcelona<br>06.08 Eating Pizza<br>06.08 feeling excited<br>EuroTrip with James, Peter<br>EuroTrip at Barcelona<br>EuroTrip eating Pizza<br>EuroTrip feeling excited<br>With James, Peter at Barcelona<br>Eating Pizza with James, Peter<br>Feeling excited with James, Peter<br>Eating Pizza at Barcelona<br>Feeling excited at Barcelona<br>Eating Pizza feeling excited |
| | | 3 | 06.08 EuroTrip with James, Peter<br>06.08 EuroTrip at Barcelona<br>06.08 EuroTrip eating Pizza<br>06.08 EuroTrip feeling excited<br>06.08 with James, Peter at Barcelona<br>06.08 eating Pizza with James, Peter<br>06.08 feeling excited with James, Peter<br>06.08 eating Pizza at Barcelona<br>06.08 feeling excited at Barcelona<br>06.08 eating Pizza feeling excited<br>EuroTrip with James, Peter at Barcelona<br>EuroTrip eating Pizza with James, Peter<br>EuroTrip feeling excited with James, Peter<br>EuroTrip eating Pizza at Barcelona<br>EuroTrip feeling excited at Barcelona<br>EuroTrip eating Pizza feeling excited<br>Eating Pizza with James, Peter at Barcelona<br>Feeling excited with James, Peter at Barcelona<br>Eating Pizza feeling excited at Barcelona |
| | — | — | — |
| | — | — | — |
| | — | — | — |
| Topic tag | 1 | 1 | 06. 08, 09. 10, 02. 12<br>EuroTrip, Biztrip<br>With James, Peter, Lisa, Tom<br>At Barcelona<br>Eating Pizza, Drinking Beer<br>Feeling excited, feeling happy |
| | | 2 | 06.08, 09.10, 02.12 EuroTrip, Biztrip<br>06.08 . . . with James, Peter, Lisa, Tom<br>06.08, 09.10, 02.12 at Barcelona<br>06.08, 09.10, 02.12 eating Pizza, drinking Beer<br>06.08, 09.10, 02.12 feeling excited, feeling happy<br>EuroTrip, Biztrip with James, Peter, Lisa, Tom<br>EuroTrip, Biztrip at Barcelona<br>EuroTrip, Biztrip eating Pizza, drinking Beer<br>EuroTrip, Biztrip feeling excited, feeling happy<br>With James, Peter, Lisa, Tom at Barcelona<br>Eating Pizza, drinking Beer with James . . .<br>Feeling excited, feeling happy with James . . .<br>Eating Pizza, drinking Beer at Barcelona<br>Feeling excited, feeling happy at Barcelona<br>Eating Pizza, drinking Beer feeling excited . . . |
| | | 3 | 06.08 . . . EuroTrip, Biztrip with James . . .<br>06.08 . . . EuroTrip, Biztrip at Barcelona<br>06.08 . . . EuroTrip, Biztrip eating Pizza, drinking Beer<br>06.08 . . . EuroTrip, Biztrip feeling excited . . .<br>06.08 . . . with James . . . at Barcelona<br>06.08 . . . eating Pizza, drinking Beer with James . . .<br>06.08 . . . feeling excited, feeling happy with James . . . |

TABLE 4-continued

| Index | Group | Number of tags | Group name |
|---|---|---|---|
| | | | 06.08 . . . eating Pizza, drinking Beer at Barcelona |
| | | | 06.08 . . . feeling excited, feeling happy at Barcelona |
| | | | 06.08 . . . eating Pizza, drinking Beer feeling excited . . . |
| | | | EuroTrip, Biztrip with James . . . at Barcelona |
| | | | EuroTrip, Biztrip eating Pizza . . . with James . . . |
| | | | EuroTrip, Biztrip feeling excited . . . with James . . . |
| | | | EuroTrip, Biztrip eating Pizza . . . at Barcelona |
| | | | EuroTrip, Biztrip feeling excited . . . at Barcelona |
| | | | EuroTrip, Biztrip eating Pizza . . . feeling excited . . . |
| | | | Eating Pizza, drinking Beer with James . . . at Barcelona |
| | | | Feeling excited . . . with James . . . at Barcelona |
| | | | Eating Pizza . . . feeling excited . . . with James . . . |
| | | | Eating Pizza . . . feeling excited . . . at Barcelona |
| | — | — | — |
| | — | — | |
| People tag | 1 | 1 | 06.08, 07.13 |
| | | | EuroTrip, Party, Workshop |
| | | | With James |
| | | | At Barcelona, Samsung Electronics central gate |
| | | | Eating Pizza, Drinking Beer |
| | | | Feeling excited |
| | | 2 | 06.08, 07.13 EuroTrip, Party, Workshop |
| | | | 06.08, 07.13 with James |
| | | | 06.08, 07.13 at Barcelona, Samsung Electronics central gate |
| | | | 06.08, 07.13 eating Pizza, drinking Beer |
| | | | 06.08, 07.13 feeling excited |
| | | | EuroTrip, Party, Workshop with James |
| | | | EuroTrip . . . at Barcelona, Samsung Electronics central gate |
| | | | EuroTrip, Party, Workshop eating Pizza, drinking Beer |
| | | | EuroTrip, Party, Workshop feeling excited |
| | | | With James at Barcelona, Samsung Electronics central gate |
| | | | Eating Pizza, drinking Beer with James |
| | | | Feeling excited with James |
| | | | Eating Pizza, drinking Beer at Barcelona . . . |
| | | | Feeling excited at Barcelona, Samsung Electronics central gate |
| | | | Eating Pizza, drinking Beer feeling excited |
| | | 3 | 06.08 . . . EuroTrip . . . with James |
| | | | 06.08 . . . EuroTrip . . . at Barcelona . . . |
| | | | 06.08 . . . EuroTrip . . . eating Pizza, Drinking Beer |
| | | | 06.08 . . . EuroTrip . . . feeling excited |
| | | | 06.08 . . . with James at Barcelona . . . |
| | | | 06.08 . . . eating Pizza, drinking Beer with James |
| | | | 06.08 . . . feeling excited with James |
| | | | 06.08 . . . eating Pizza, drinking Beer at Barcelona . . . |
| | | | 06.08 . . . feeling excited at Barcelona . . . |
| | | | 06.08 . . . eating Pizza, drinking Beer feeling excited |
| | | | EuroTrip . . . with James at Barcelona . . . |
| | | | EuroTrip . . . eating Pizza, drinking Beer with James |
| | | | EuroTrip . . . feeling excited with James |
| | | | EuroTrip . . . eating Pizza, drinking Beer at Barcelona . . . |
| | | | EuroTrip . . . feeling excited at Barcelona . . . |
| | | | Eating Pizza, drinking Beer with James at Barcelona . . . |
| | | | Feeling excited with James at Barcelona . . . |
| | — | — | — |
| | — | — | — |
| — | — | — | — |
| — | — | — | — |

TABLE 5

| Index combination | Group | Number of tags | Group name |
|---|---|---|---|
| Date tag + topic tag | — | — | — |
| | — | — | — |
| Date tag + people tag | — | — | — |
| | — | — | — |
| | 2 | 1 | 07. 13<br>Party, Workshop<br>With James<br>At Samsung Electronics central gate<br>Drinking Beer, eating Pizza<br>Feeling excited |
| | | 2 | 07.13 Party, Workshop<br>07.13 with James<br>07.13 at Samsung Electronics central gate<br>07.13 drinking Beer, eating Pizza<br>07.13 feeling excited<br>Party, Workshop with James<br>Party, Workshop at Samsung Electronics central gate<br>Party, Workshop drinking Beer, eating Pizza<br>Party, Workshop feeling excited<br>With James at Samsung Electronics central gate<br>Drinking Beer, eating Pizza with James<br>Feeling excited with James<br>Drinking Beer, eating Pizza at Samsung Electronics central gate<br>Feeling excited at Samsung Electronics central gate<br>Drinking Beer, eating Pizza feeling excited |
| | | 3 | 07.13 Party, Workshop with James<br>07.13 Party, Workshop At Samsung Electronics central gate<br>07.13 Party, Workshop drinking Beer, eating Pizza<br>07.13 Party, Workshop feeling excited<br>07.13 with James at Samsung Electronics central gate<br>07.13 drinking Beer, eating Pizza with James<br>07.13 feeling excited with James<br>07.13 drinking Beer, eating Pizza at Samsung Electronics central gate<br>07.13 feeling excited at Samsung Electronics central gate<br>Party, Workshop with James at Samsung Electronics central gate<br>Party, Workshop drinking Beer . . . with James<br>Party, Workshop feeling excited with James<br>Party, Workshop drinking Beer . . . at Samsung Electronics central gate<br>Party, Workshop feeling excited at Samsung Electronics central gate<br>Drinking Beer . . . feeling excited with James<br>Drinking Beer . . . feeling excited at Samsung Electronics central gate |
| | — | — | — |
| | — | — | — |
| — | — | — | — |
| — | — | — | — |

The electronic device may determine a ranking of the images according to each group. For example, the electronic device may determine the ranking of the images according to each group by using tags. Further, the electronic device may select a representative image within each group. When there is one image in the group, the electronic device may select the corresponding image as the representative image.

When there is a plurality of images within the group, the electronic device may determine a ranking of the images. Further, the electronic device may select one image having a highest ranking among the images as the representative image.

For example, the electronic device may determine the ranking of the images by comparing date tags of the images. That is, the electronic device may determine the ranking of the images according to dates of the images. Further, the electronic device may select one most recent image among the images as the representative image.

The electronic device may also determine the ranking of the images by comparing frequencies of the tags among the images. For example, the electronic device may determine the ranking of the images by comparing frequencies of the people tags among the images. That is, the ranking of the image having two people tags may be higher than the ranking of the image having one people tag.

The electronic device may also determine the ranking of the images by comparing the response tags of the images. Alternatively, the electronic device may determine the ranking of the images by comparing the emotion tags of the images.

Referring again to FIG. 10, the electronic device displays the images in step 1017.

For example, the electronic device may display the images in response to a user input for displaying the images. That is, the electronic device may enter an image display mode to display the images. Further, the electronic device may display the images according to each group. The electronic device may arrange groups and then arrange the images within each group. For example, the electronic device may arrange the groups according to a date of a representative image of each group.

Alternatively, the electronic device may arrange the groups according to the number of images of each group.

FIGS. 13, 14, 15, and 16 illustrate an image display method according to an embodiment of the present disclosure.

Figure 13:
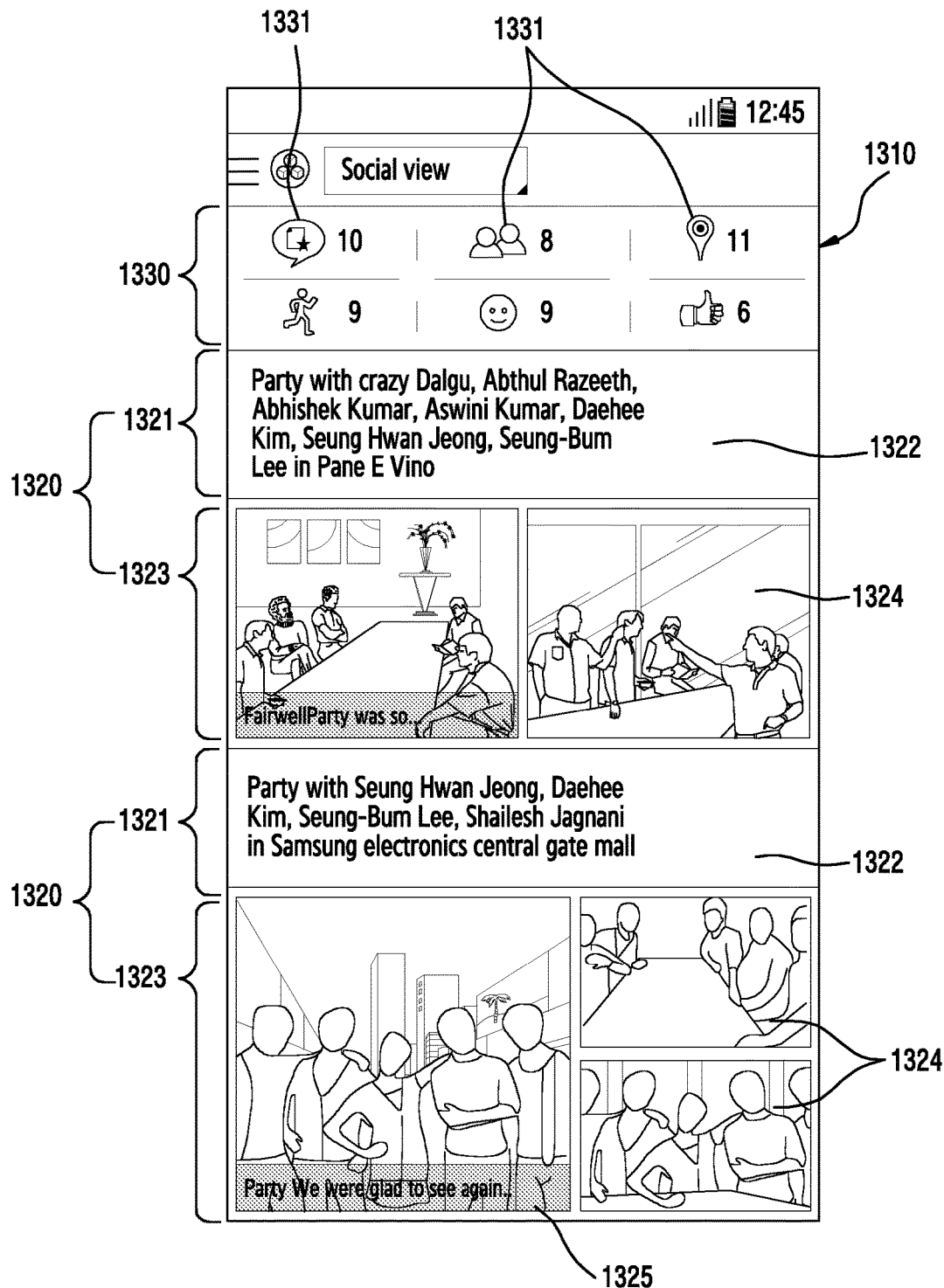
FIGS. 13, 14, 15, and 16 illustrate examples of an image display method according to an embodiment of the present disclosure.

Referring to FIG. 13, the electronic device displays an image group screen 1310. The image group screen 1310 includes a plurality of group areas 1320 and an attribute area 1330. The group areas 1320 may correspond to respective groups. Further, the group areas 1320 may have the same size or different sizes according to the number of images 1324 within each group. In addition, each of the group areas 1320 include a name area 1321 and an image area 1323.

The electronic device may divide groups and display the divided groups in the group areas 1320. The electronic device displays a group-specific name 1322 in the name area 1321 and intra-group images 1324 in the image area 1323.

The electronic device may arrange the images 1324 in the image area 1323 according to ranking thereof. Further, the electronic device may change the size of the images 1324 according to the ranking of the images 1324. The electronic device may also display a caption 1325 in at least one of the images 1324 within each group. For example, the electronic device may display the caption 1325 in the representative image 1324 within each group. Further, the electronic device may display attribute icons 1331 indicating attributes of tags in an attribute area 1330.

Figure 12:
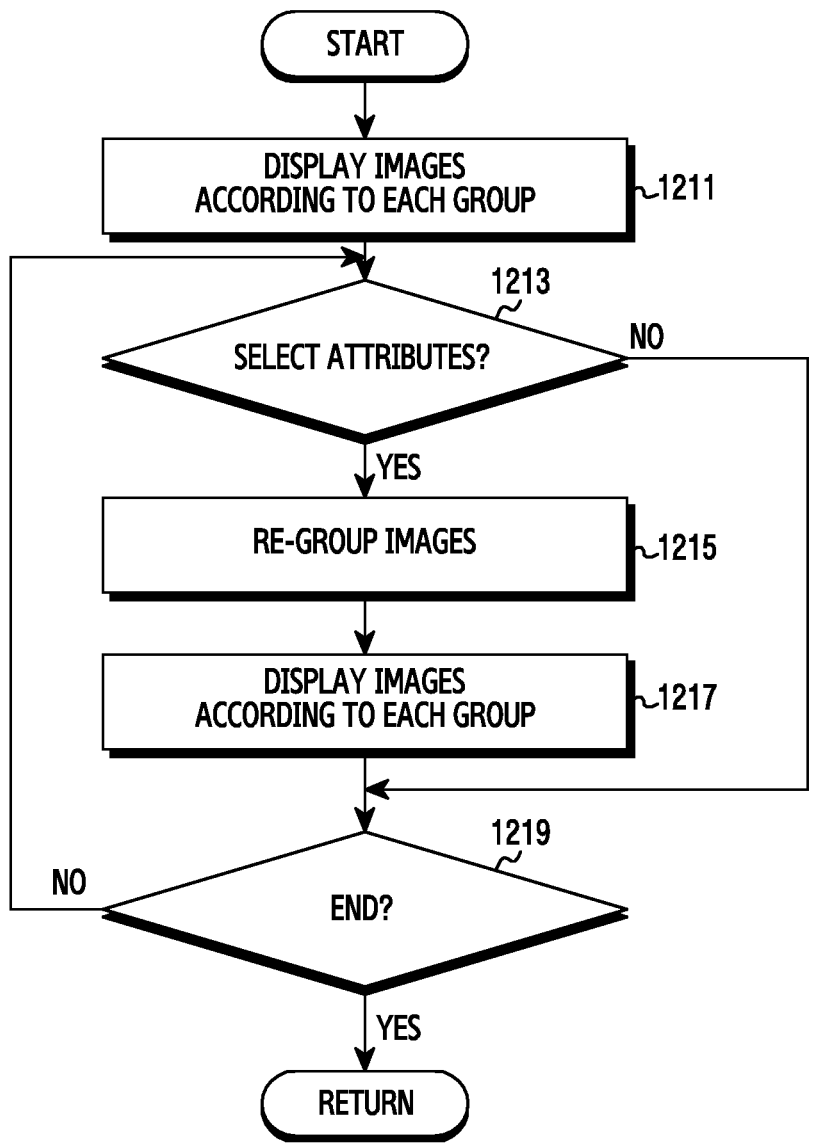
FIG. 12 is a flowchart illustrating an image display operation according to an embodiment of the present disclosure.

FIG. 12 is a flowchart illustrating an operation of displaying an image according to an embodiment of the present disclosure. For example, the operation illustrated in FIG. 12 can be performed during step 1017 of FIG. 10.

Referring to FIG. 12, the electronic device displays images corresponding to each group in step 1211. For example, the electronic device may display the image group screen 1310 as illustrated in FIG. 13.

When at least one of the attributes of the tags is selected in step 1213, the electronic device re-groups images in step 1215. For example, referring again to FIG. 13, when at least one of the attribute icons 1331 is selected in the attribute area 1330 of the image group careen 1310, the electronic device may detect the selected attribute icon. Here, one of the attribute icons 1331 may be selected or at least two of the attribute icons 1331 may be simultaneously selected.

Thereafter, the electronic device may re-group the images according to at least one of the attributes of the tags. The electronic device may classify the images into at least one group according to at least one of a topic tag, people tag, location tag, date tag, activity tag, emotion tag, and response tag.

More specifically, when one of the attributes of the tags is selected in step 1213, the electronic device may classify the images into at least one group according to one of the tags. However, when at least two of the attributes of the tags are selected in step 1213, the electronic device may classify the images into at least one group by combining at least two of the tags.

The electronic device may determine ranking of the images according to each group. For example, the electronic device may determine the ranking of the images according to each group by using tags.

Further, the electronic device may select a representative image within each group. When there is one image in the group, the electronic device may select the corresponding image as the representative image.

When there is a plurality of images within the group, the electronic device may determine a ranking of the images. Further, the electronic device may select one image having highest ranking among the images as the representative image.

For example, the electronic device may determine the ranking of the images by comparing date tags of the images. That is, the electronic device may determine the ranking of the images according to dates of the images. Further, the electronic device may select one most recent image among the images as the representative image. The electronic device may also determine the ranking of the images by comparing frequencies of the tags among the images.

For example, the electronic device may determine the ranking of the images by comparing frequencies of the people tags among the images. That is, the ranking of the image having two people tags may be higher than the ranking of the image having one people tag.

Alternatively, the electronic device may determine the ranking of the images by comparing the response tags of the images, or by comparing the emotion tags of the images.

Referring again to FIG. 12, the electronic device displays the images in step 1217. For example, the electronic device may display the images according to each group. The electronic device may arrange groups and then arrange the images within each group. The electronic device may arrange the groups according to a date of a representative image of each group. Alternatively, the electronic device may arrange the groups according to the number of images of each group.

Figure 14:
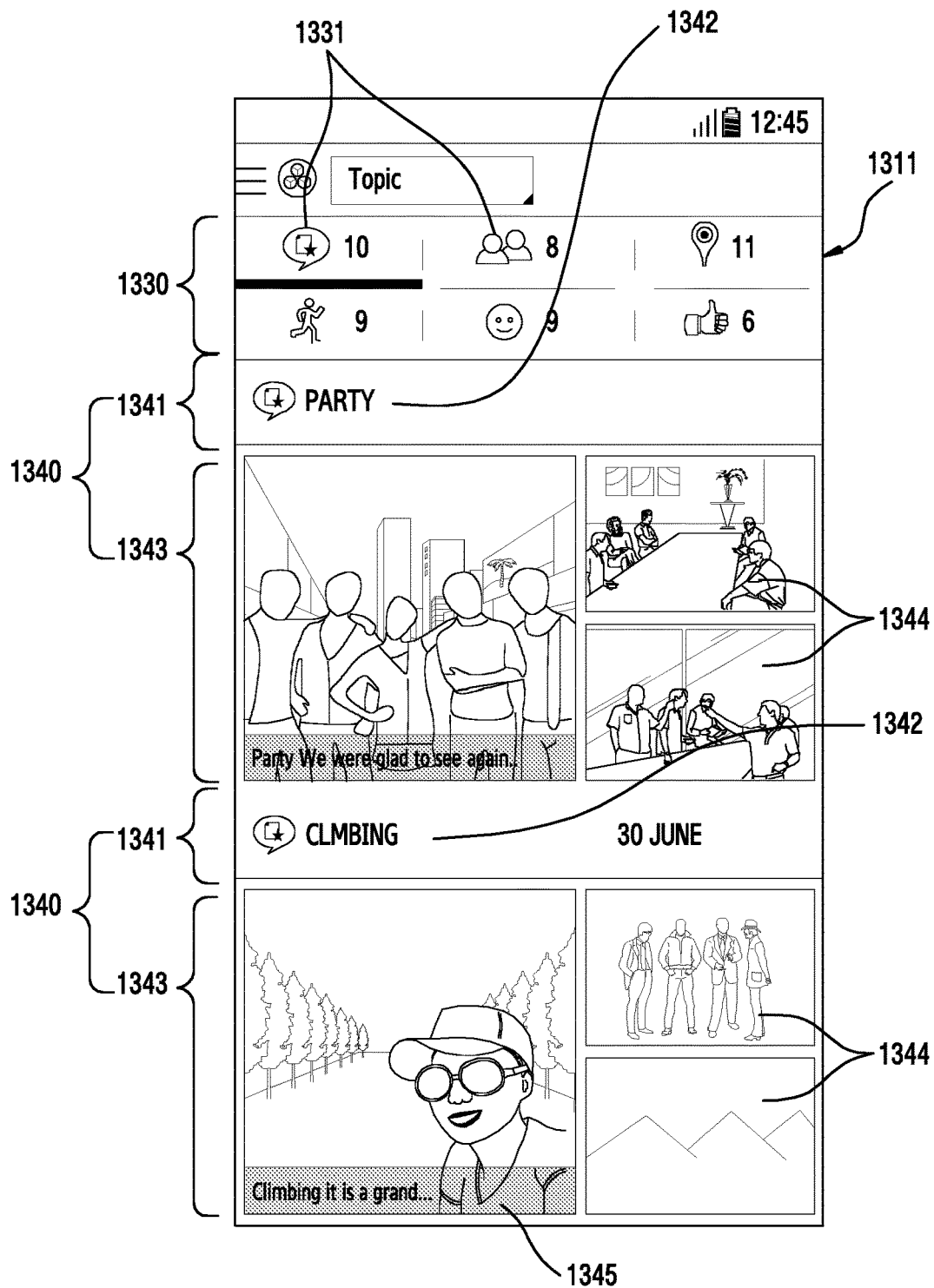

For example, when a topic is selected from the attributes of the tags, the electronic device may display an image group screen 1311, as illustrated in FIG. 14.

Referring to FIG. 14, the image group screen 1311 includes an attribute area 1330 and a plurality of group areas 1340. The group areas 1340 correspond to respective groups. Further, the group areas 1340 may have the same size or different sizes according to the number of images 1344 within each group. In addition, each of the group areas 1340 may include a name area 1341 and an image area 1343.

The electronic device may divide groups and display the divided groups in the group areas 1340. The electronic device may display a group-specific topic tag 1342 in the name area 1341 and intra-group images 1344 in an image area 1343. The electronic device may arrange the images 1344 in the image area 1343 according to a ranking thereof. Further, the electronic device may change the size of the images 1344 according to the ranking of the images 1344. In addition, the electronic device may display a caption 1345 in at least one of the images 1344 within each group. For example, the electronic device may display the caption 1345 in the representative image 1344 within each group.

Figure 15:
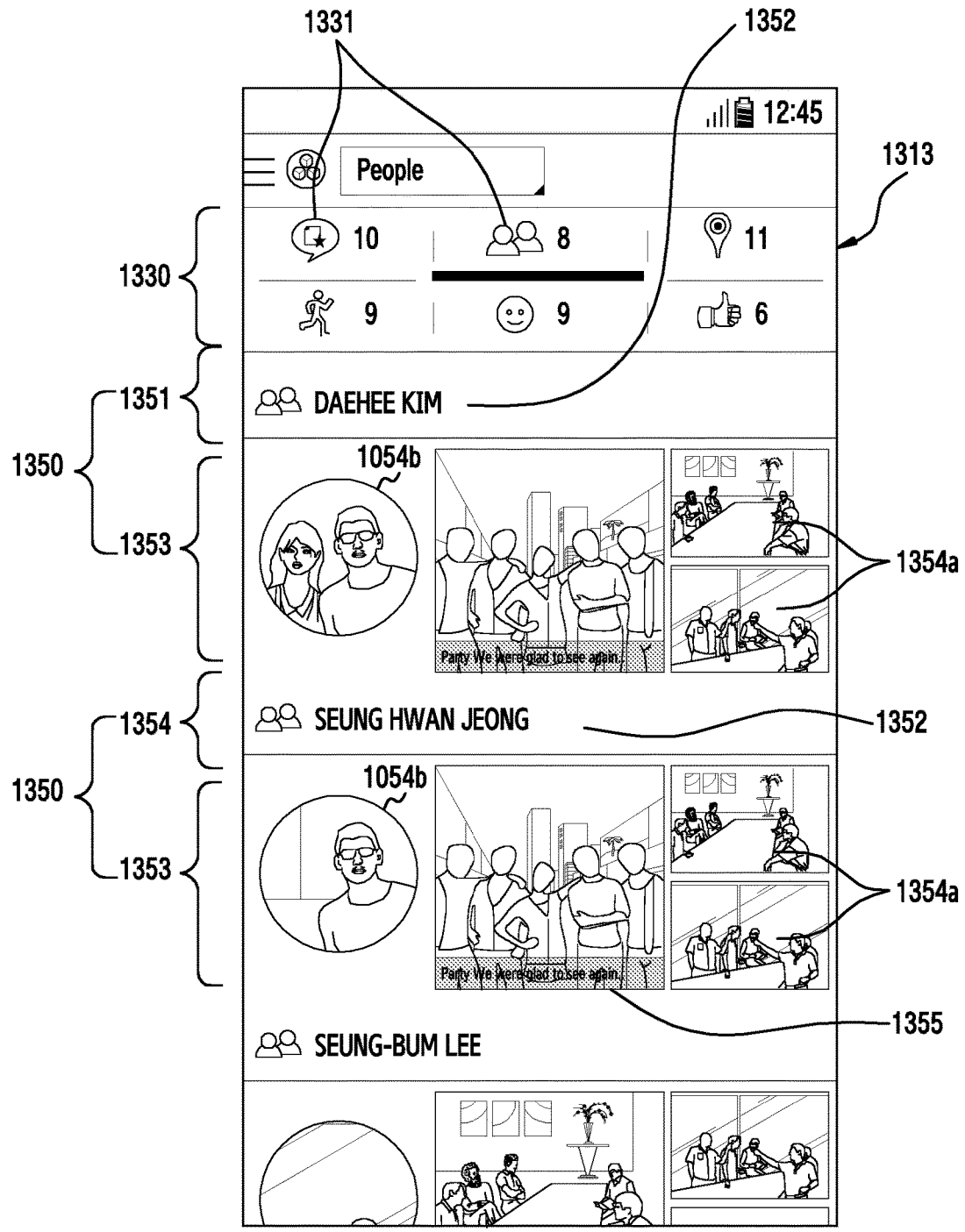

When people are selected from the attributes of the tags, the electronic device may display an image group screen 1313 as illustrated in FIG. 15.

Referring to FIG. 15, the image group screen 1313 includes the attribute area 1330 and the plurality of group areas 1350. The group areas 1350 correspond to respective groups. Further, the group areas 1350 may have the same size or different sizes according to the number of images 1354*a* within each group. In addition, each of the group areas 1350 includes a name area 1351 and an image area 1353.

The electronic device may divide groups and display the divided groups in the group areas 1350. The electronic device may display a group-specific people tag 1352 in the name area 1351 and intra-group images 1354*a* in an image area 1353. The electronic device may further display a profile image 1354*b* corresponding to the people tag in the image area 1353. Further, the electronic device may arrange the images 1354*a* in the image area 1353 according to ranking thereof.

The electronic device may change the size of the images 1354*a* according to the ranking of the images 1354*a*. In addition, the electronic device may display a caption 1355 in at least one of the images 1354*a* within each group. For example, the electronic device may display the caption 1355 in the representative image 1354*a* within each group.

Figure 16:
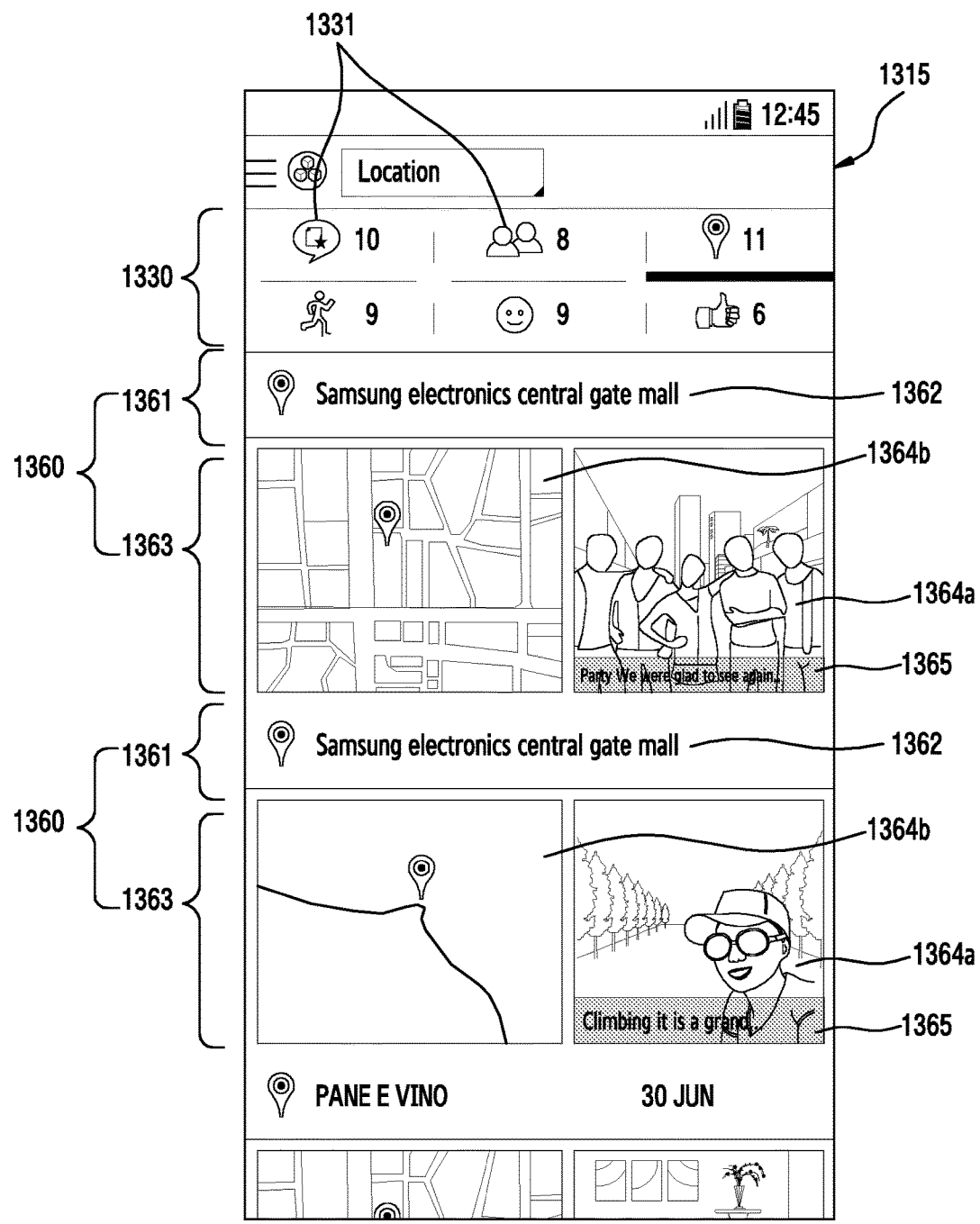

When a location is selected from the attributes of the tags in operation 1213, the electronic device may display an image group screen 1315 as illustrated in FIG. 16.

Referring to FIG. 16, the image group screen 1315 includes the attribute area 1330 and a plurality of group areas 1360. The group areas 1360 may correspond to respective groups. Further, the group areas 1360 may have the same size or different sizes according to the number of images 1364*a* within each group. In addition, each of the group areas 1360 may include a name area 1361 and an image area 1363.

The electronic device may divide groups and display the divided groups in the group areas 1360. The electronic device may display a group-specific location tag 1362 in the name area 1361 and intra-group images 1364*a* in an image area 1363. The electronic device may further display a map image 1364*b* having a location coordinate corresponding to the location tag 1362 in the image area 1363.

Further, the electronic device may arrange the images 1364*b* in the image area 1363 according to a ranking thereof.

The electronic device may change the size of the images 1364*b* according to the ranking of the images 1364*b*. In addition, the electronic device may display a caption 1365 in at least one of the images 1364*a* within each group. For example, the electronic device may display the caption 1365 in the representative image 1364*a* within each group.

When one of the activity, emotion, and response is selected from the attributes of the tags in step 1213, the electronic device may display an image group screen.

Similar to FIGS. 14, 15, and 16, the image group screen may include an attribute area and a plurality of group areas. The group areas may correspond to groups, respectively. Further, the group areas may have the same size or different sizes according to the number of images within each group. In addition, each group area may include a name area and an image area.

For example, the electronic device may divide groups and display the divided groups in the group areas. Further, the electronic device may display a group-specific name in the name area and intra-group images in the image area. The electronic device may arrange the images in the image area according to a ranking thereof. Further, the electronic device may change the size of the images according to the ranking of the images. In addition, the electronic device may display a caption in at least one of the images within each group. The electronic device may display the caption in the representative image within each group.

When the displaying of the images ends in step 1219, the operation ends; otherwise, the operation returns to step 1213.

In accordance with an embodiment of the present disclosure, an electronic device may group images and display the images according to each group. Accordingly, the electronic device effectively displays the images and effectively provides information on the images. That is, the user of the electronic device may easily identify the information on the images.

Further, the electronic device may effectively provide a correlation between the images, such that the user of the electronic device may easily identify the correlation between the images. Accordingly, it is possible to improve the use efficiency of the electronic device and increase the user convenience.

Herein, the term "module" refers to a unit including one of hardware, software, and firmware, or a combination of two or more of them, for example. For example, "module" may be used interchangeably with terms like unit, logic, logical block, component or circuit.

A "module" may be a minimum unit of an integrally configured part or a part of it, may be a minimum unit that performs one or more functions or a part of it, and/or may be implemented mechanically or electronically. For example, "module" may include at least one of an Application Specific Integrated Circuit (ASIC) chip, Field Programmable Gate Arrays (FPGAs), and a programmable logic device which perform any operation that is already well known or will be developed in the future.

A module or programming module according to various embodiments may include one or more of the above-described elements, may omit some elements, or may further include additional other elements. The operations performed by the module, the programming module, or the other elements according to various embodiments may be performed serially, in parallel, repeatedly, or heuristically. In addition, some operation may be performed in different order or may be omitted, and additional other operations may be added.

At least part of the apparatus (e.g., modules or functions) or method (e.g., operations) may be implemented by using instructions stored in a computer-readable storage media in the form of a programming module. When the instructions are executed by one or more processors (e.g., the processor 120), the one or more processors may perform a function corresponding to the instructions. The computer-readable storage media may be the memory 130.

Examples of the computer-readable recording medium include hard disks, floppy disks, magnetic media (for example, magnetic tapes), optical media (for example, Compact Disc Read Only Memories (CD-ROMs), Digital Versatile Disc (DVDs), magneto-optical media (for example, floptical disks)), and hardware devices (for example, Read Only Memories (ROMs), Random Access Memories (RAMs) and flash memories). Examples of the program commands include machine language codes created by a compiler, and high-level language codes that can be executed by a computer by using an interpreter. The above-described hardware devices may be configured to operate as one or more software modules for performing operations of various exemplary embodiment of the present disclosure, and vice versa.

A recording medium according to various embodiments may include a program for executing an operation for acquiring one or more images and one or more tags corresponding to one or more images, an operation for classifying one or more images to be a group based on one or more tags, and an operation for displaying one or more images corresponding to a group.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of displaying an image by an electronic device, the method comprising:
   acquiring, from a server, at least one image and a caption which have been posted on a web page associated with the server, the caption being attached to and outside of the at least one image on the web page;
   obtaining at least one tag associated with the at least one image from the caption;
   classifying the at least one image into a group, based on a response tag included in the at least one tag, the response tag including information on at least one of a number of comments and a number of likes; and
   displaying the at least one image corresponding to the group.

2. The method of claim 1,
   wherein the at least one tag includes at least one of a topic tag, a people tag, a location tag, a date tag, an activity tag, and an emotion tag, and
   wherein the at least one image is classified into the group based on the response tag and the at least one of the topic tag, the people tag, the location tag, the date tag, the activity tag, and the emotion tag.

3. The method of claim 1, wherein classifying the at least one image comprises:
   determining the response tag as an index; and
   classifying the at least one image into the group based on the index.

4. The method of claim 1, wherein displaying the at least one image comprises:
   generating a name of the group based on the at least one tag.

5. The method of claim 4, wherein displaying the at least one image further comprises:
   displaying the name of the group together with the at least one image corresponding to the group.

6. The method of claim 4, wherein the name of the group is generated based on a set attribute of the at least one tag, and
   wherein at least one attribute of the at least one tag includes at least one of a topic, people, a location, a date, an activity, an emotion, and a response.

7. The method of claim 1, wherein displaying the at least one image comprises:
   determining a ranking of the at least one image corresponding to the group based on at least one of a date tag, the response tag and an emotion tag of the at least one image, or a frequency of the at least one tag; and
   displaying the at least one image corresponding to the group based on the ranking.

8. The method of claim 7, wherein displaying the at least one image comprises displaying a caption within an image having a highest ranking among the at least one image based on the ranking.

9. The method of claim 1, wherein displaying the at least one image comprises:
   displaying at least one attribute of the at least one tag;
   re-classifying the at least one image into at least one new group according to at least one attribute selected from the at least one attribute; and
   displaying the re-classified image corresponding to the new group.

10. The method of claim 1, wherein acquiring the at least one image and the caption comprises:
    when the at least one image corresponds to a previously stored image, replacing the at least one image with the previously stored image.

11. An electronic device comprising:
    a display;
    a communication interface; and
    a processor configured to:
    acquire, from a server, using the communication interface, at least one image and a caption which have been posted on a web page associated with the server, the caption being attached to and outside of the at least one image on the web page;
    obtain at least one tag associated with the at least one image from the caption;
    classify the at least one image into a group, based on a response tag included in the at least one tag, the response tag including information on at least one of a number of comments and a number of likes; and
    control the display to display the at least one image corresponding to the group.

12. The electronic device of claim 11,
    wherein the at least one tag includes at least one of a topic tag, a people tag, a location tag, a date tag, an activity tag, and an emotion tag, and
    wherein the processor is further configured to classify the at least one image into the group based on the response tag and the at least one of the topic tag, the people tag, the location tag, the date tag, the activity tag, and the emotion tag.

13. The electronic device of claim 11, wherein the processor is further configured to:
    determine the response tag as an index; and
    classify the at least one image into the group based on the index.

14. The electronic device of claim 11, wherein processor is further configured to generate a name of the group based on the at least one tag.

15. The electronic device of claim 14, wherein processor is further configured control the display to display the name of the group together with the at least one image corresponding to the group.

16. The electronic device of claim 14, wherein the processor is further configured to generate the name of the group based on a set attribute of the at least one tag, and
    wherein at least one attribute includes at least one of a topic, people, a location, a date, an activity, an emotion, and a response.

17. The electronic device of claim 11, wherein the processor is further configured to:
    determine a ranking of the at least one image corresponding to the group based on at least one of a date tag, a response tag or an emotion tag of the image, and a frequency of the at least one tag, and control the displayto display the at least one image corresponding to the group based on the ranking.

18. The electronic device of claim 17, wherein the processor is further configured to control the displayto display an image having a highest ranking among the at least one image based on the ranking.

19. The electronic device of claim 11, wherein the processor is further configured to:
control the display to display at least one attribute of the at least one tag;
re-classify the at least one image into at least one new group according to at least one attribute selected from the at least one attribute; and
control the display to the re-classified image corresponding to the new group.

20. The electronic device of claim 11, further comprising a memory,
wherein the processor is further configured to replace, when the at least one image corresponds to a previously stored image stored in the memory, the at least one image with the previously stored image.

\* \* \* \* \*